(12) United States Patent
Wippermann et al.

(10) Patent No.: US 11,570,346 B2
(45) Date of Patent: Jan. 31, 2023

(54) MULTI-APERTURE IMAGING DEVICE HAVING A LOW INSTALLATION HEIGHT AND A SWITCHABLE VIEWING DIRECTION, IMAGING SYSTEM AND METHOD FOR PROVIDING A MULTI-APERTURE IMAGING DEVICE

(71) Applicant: Fraunhofer-Gesellschaft zur Förderung der angewandten Forschung e.V., Munich (DE)

(72) Inventors: Frank Wippermann, Jena (DE); Nico Hagen, Jena (DE); Andreas Reimann, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 87 days.

(21) Appl. No.: 16/813,791

(22) Filed: Mar. 10, 2020

(65) Prior Publication Data

US 2020/0221003 A1 Jul. 9, 2020

Related U.S. Application Data

(63) Continuation of application No. PCT/EP2018/074328, filed on Sep. 10, 2018.

(30) Foreign Application Priority Data

Sep. 13, 2017 (DE) .......................... 102017216172.8

(51) Int. Cl.
*H04N 5/225* (2006.01)
(52) U.S. Cl.
CPC ......... *H04N 5/2258* (2013.01); *H04N 5/2254* (2013.01); *H04N 5/2259* (2013.01)

(58) Field of Classification Search
CPC .. H04N 5/2258; H04N 5/2254; H04N 5/2259; H04N 5/23238; H04N 5/23248;
(Continued)

(56) References Cited

U.S. PATENT DOCUMENTS

| 10,334,172 B2 | 6/2019 | Wippermann et al. |
| 2007/0041723 A1 | 2/2007 | Gutierrez et al. |

(Continued)

FOREIGN PATENT DOCUMENTS

| DE | 10 2015 215 836 A | 2/2017 |
| DE | 102015215833 A1 | 2/2017 |

(Continued)

OTHER PUBLICATIONS

Office Action dated May 15, 2020, issued in German application No. 10 2017 216 172.8.

(Continued)

*Primary Examiner* — Abdelaaziz Tissire
(74) *Attorney, Agent, or Firm* — McClure, Qualey & Rodack, LLP

(57) ABSTRACT

A multi-aperture imaging device includes an image sensor, an array of optical channels, each optical channel including an optic for imaging a partial field of view of a total field of view onto an image sensor region of the image sensor, and a beam-deflector switchable between a first rotational position and a second rotational position by executing a switching movement, and configured to deflect, in a first rotational position, optical paths of the optical channels into a first viewing direction, and to deflect, in a second rotational position, the optical paths of the optical channels into a second viewing direction. The array is configured to execute, based on the switching movement, an adjustment movement for adjusting an orientation of the array with respect to the beam-deflector.

48 Claims, 22 Drawing Sheets

(58) Field of Classification Search
CPC .. H04N 5/2328; H04N 5/2253; H04N 5/2252; G02B 19/0076; G02B 5/09; G02B 27/646; G02B 26/0816

See application file for complete search history.

(56) References Cited

U.S. PATENT DOCUMENTS

| | | | |
|---|---|---|---|
| 2008/0112029 A1* | 5/2008 | Bodkin | G01J 3/36 |
| | | | 359/741 |
| 2009/0268081 A1* | 10/2009 | Tang | G03B 19/07 |
| | | | 348/E5.022 |
| 2010/0328471 A1* | 12/2010 | Boland | G02B 13/0065 |
| | | | 348/207.99 |
| 2010/0328954 A1* | 12/2010 | Bodkin | H04N 5/332 |
| | | | 362/277 |
| 2011/0211085 A1* | 9/2011 | Wang | G02B 5/045 |
| | | | 211/26 |
| 2015/0293328 A1 | 10/2015 | Laroia | |
| 2016/0255330 A1 | 9/2016 | Wippermann et al. | |
| 2017/0059857 A1 | 3/2017 | Laroia et al. | |
| 2017/0118388 A1 | 4/2017 | Wippermann et al. | |
| 2017/0264825 A1 | 9/2017 | Wippermann et al. | |
| 2018/0172945 A1 | 6/2018 | Wippermann et al. | |
| 2018/0176437 A1 | 6/2018 | Wippermann et al. | |
| 2018/0176471 A1 | 6/2018 | Wippermann et al. | |
| 2018/0176472 A1 | 6/2018 | Wippermann et al. | |
| 2018/0176473 A1 | 6/2018 | Wippermann et al. | |
| 2018/0184068 A1 | 6/2018 | Wippermann et al. | |
| 2018/0198963 A1 | 7/2018 | Wippermann et al. | |
| 2018/0241920 A1* | 8/2018 | Wippermann | G03B 5/00 |
| 2018/0324334 A1 | 11/2018 | Wippermann et al. | |
| 2019/0011809 A1 | 1/2019 | Wippermann et al. | |
| 2019/0068950 A1 | 2/2019 | Wippermann et al. | |
| 2019/0104242 A1 | 4/2019 | Wippermann et al. | |
| 2019/0394398 A1 | 12/2019 | Wippermann et al. | |

FOREIGN PATENT DOCUMENTS

| | | | | |
|---|---|---|---|---|
| DE | 102015215836 A1 | 2/2017 | | |
| DE | 102015215844 A1 | 2/2017 | | |
| DE | 102015215845 A1 | 2/2017 | | |
| DE | 102015220566 A1 | 4/2017 | | |
| DE | 102015220566 A1 * | 4/2017 | ......... | G02B 13/0065 |
| DE | 102016200285 A1 | 7/2017 | | |
| DE | 102016200287 A1 | 7/2017 | | |
| JP | 2018-532143 A | 11/2018 | | |
| JP | 2018-536892 A | 12/2018 | | |
| JP | 2019-508731 A | 3/2019 | | |
| WO | 2016166730 A1 | 10/2016 | | |
| WO | 2017/029376 A1 | 2/2017 | | |
| WO | 2017/037688 A1 | 3/2017 | | |
| WO | 2017/067977 A1 | 4/2017 | | |
| WO | 2017/121762 A1 | 7/2017 | | |
| WO | 2019008063 A1 | 1/2019 | | |

OTHER PUBLICATIONS

Japanese language office action dated Apr. 12, 2021, issued in application No. JP 2020-514987.
English language translation of office action.
International Search Report and written opinion, dated Sep. 10, 2018.
International Search Report, dated Jun. 14, 2019.
PCT Written Opinion, dated Aug. 8, 2019.
IPRP, dated Nov. 20, 2019.

* cited by examiner

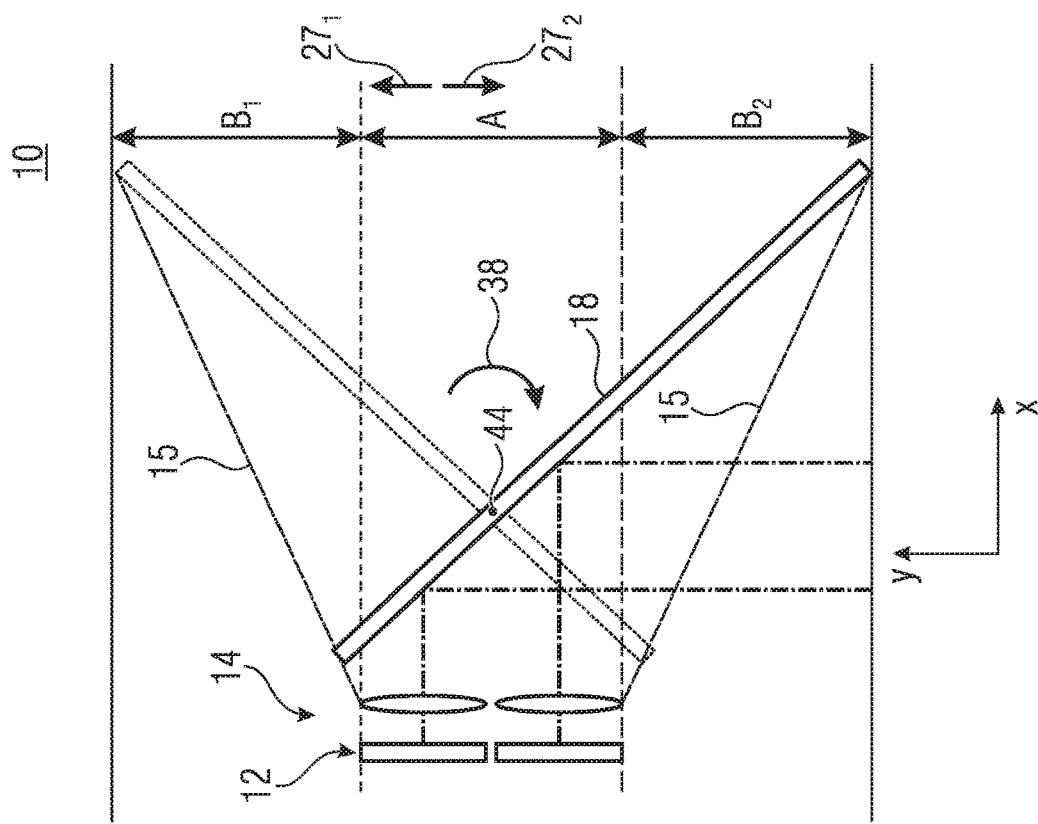
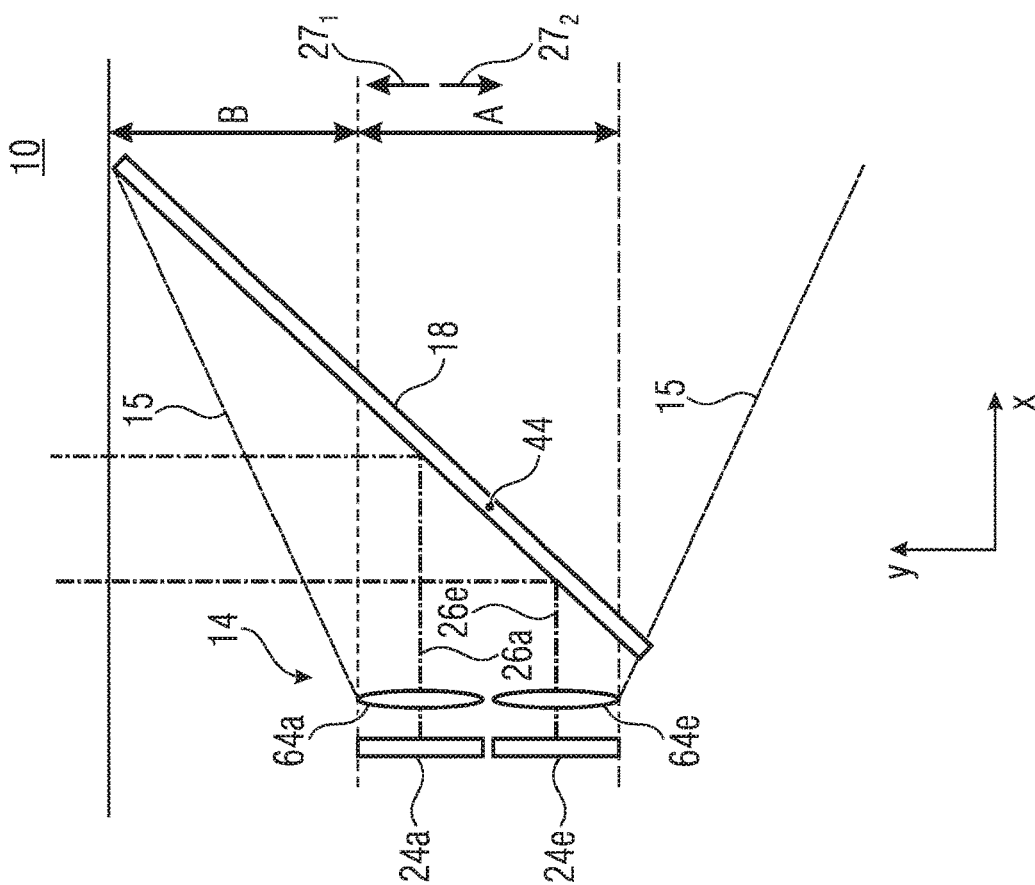

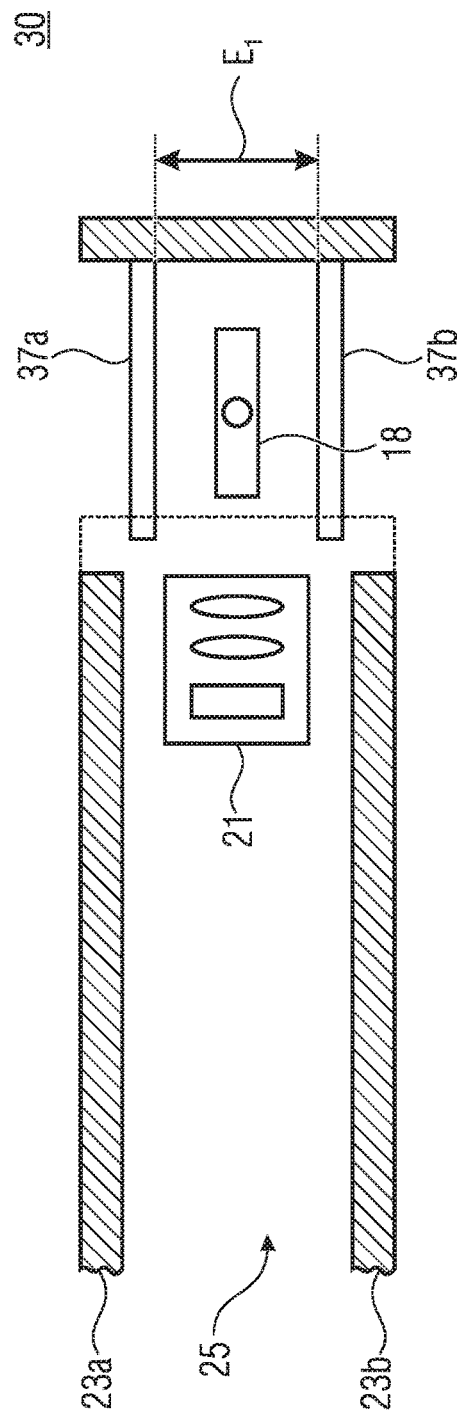
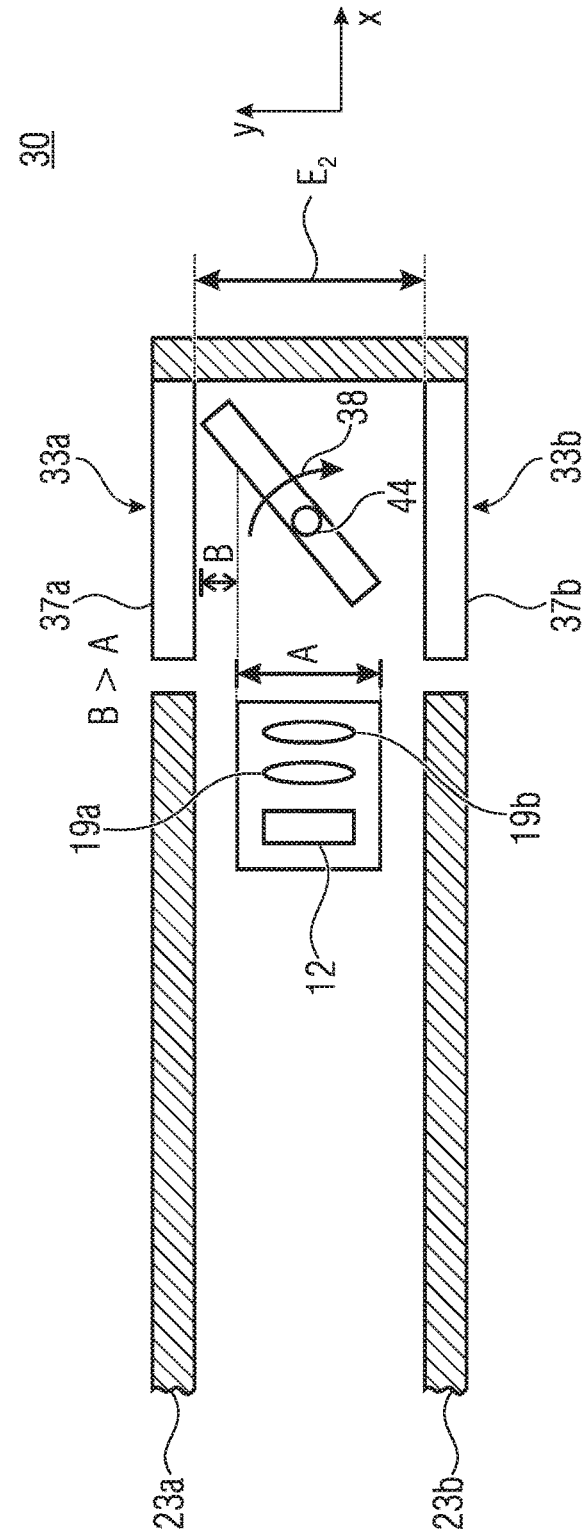

1500

```
┌─────────────────────────────────────────────────────────┐
│ Imaging a first object region with an array of optical  │
│ channels, wherein each optical channel includes an      │
│ optic for imaging a partial field of view of a total    │
│ field of view onto an image sensor region of the image  │──1510
│ sensor; by deflecting optical paths of the optical      │
│ channels into a first viewing direction with a beam-    │
│ deflecting means in a first rotational position         │
└─────────────────────────────────────────────────────────┘
                            │
                            ▼
┌─────────────────────────────────────────────────────────┐
│ Executing a switching movement of the beam-deflecting   │
│ means to switch the same between the first rotational   │
│ position and a second rotational position such that the │──1520
│ optical channels are deflected into a second viewing    │
│ direction                                               │
└─────────────────────────────────────────────────────────┘
                            │
                            ▼
┌─────────────────────────────────────────────────────────┐
│ Executing an adjustment movement of the array based     │
│ on the switching movement to adjust an alignment        │──1530
│ of the array with respect to the beam-deflecting means  │
└─────────────────────────────────────────────────────────┘
```

Fig. 15

MULTI-APERTURE IMAGING DEVICE HAVING A LOW INSTALLATION HEIGHT AND A SWITCHABLE VIEWING DIRECTION, IMAGING SYSTEM AND METHOD FOR PROVIDING A MULTI-APERTURE IMAGING DEVICE

CROSS-REFERENCE TO RELATED APPLICATIONS

This application is a continuation of copending International Application No. PCT/EP2018/074328, filed Sep. 10, 2018, which is incorporated herein by reference in its entirety, and additionally claims priority from German Application No. 102017216172.8, filed Sep. 13, 2017, which is also incorporated herein by reference in its entirety.

The present invention relates to a multi-aperture imaging device, an imaging system and a method for providing a multi-aperture imaging device. The present invention further relates to a multi-aperture imaging device and a multi-aperture imaging system having a movable array arrangement.

BACKGROUND OF THE INVENTION

Conventional cameras have an imaging channel that images the entire object field. The cameras have adaptive components that enable a relative lateral, two-dimensional displacement between an objective and an image sensor for realizing an optical image stabilization function.

Multi-aperture imaging systems having a linear channel arrangement consist of several imaging channels, each only capturing a part of the object and containing a deflecting mirror. The deflecting mirror may be rotatably supported and, among other things, enable switching the viewing direction so that the same camera may see different viewing directions, e.g., the viewing directions forming an angle of 180°. The installation height of the mirror influences the overall height of the camera, whereas the lenses needed for imaging comprise a low overall height, i.e., the mirrors are taller than the lenses. By using the camera in two viewing directions as a result of a rotation of the mirrors into another deflecting position, the needed installation height is additionally increased in a disadvantageous manner.

Concepts for capturing object regions or fields of view in a multi-channel manner which enable high quality image capturing would be desirable.

SUMMARY

According to an embodiment, a multi-aperture imaging device may have: an image sensor; an array of optical channels, each optical channel including an optic for imaging a partial field of view of a total field of view onto an image sensor region of the image sensor; and a beam-deflecting means switchable between a first rotational position and a second rotational position by executing a switching movement and configured to deflect, in a first rotational position, optical paths of the optical channels into a first viewing direction and to deflect, in a second rotational position, the optical paths of the optical channels into a second viewing direction; wherein the array is configured to execute, based on the switching movement, an adjustment movement for adjusting an orientation of the array with respect to the beam-deflecting means.

According to another embodiment, an imaging system may have first and second modules including an inventive multi-aperture imaging device, wherein the first and the second modules are configured to at least stereoscopically capture the total field of view.

According to another embodiment, a method for capturing an object region may have the steps of: imaging a first object region with an array of optical channels, each optical channel including an optic for imaging a partial field of view of a total field of view onto an image sensor region of the image sensor; by deflecting optical paths of the optical channels in a first viewing direction with a beam-deflecting means in a first rotational position; executing a switching movement of the beam-deflecting means in order to switch the same between the first rotational position and a second rotational position so that the optical channels are deflected into a second viewing direction; executing an adjustment movement of the array based on the switching movement in order to adjust an orientation of the array with respect to the beam-deflecting means.

According to another embodiment, a method for providing a multi-aperture imaging device may have the steps of: providing an image sensor; arranging an array of optical channels such that each optical channel includes an optic for imaging a partial field of view of a total field of view onto an image sensor region of the image sensor; arranging a beam-deflecting means such that the same is switchable between a first rotational position and a second rotational position by executing a switching movement, and is configured to deflect, in a first rotational position, optical paths of the optical channels into a first viewing direction, and to deflect, in a second rotational position, the optical paths of the optical channels into a second viewing direction; so that the array is configured to execute, based on the switching movement, an adjustment movement for adjusting an orientation of the array with respect to the beam-deflecting means.

It is one finding of the present invention to have recognized that, due to the combination of a movement of the beam-deflecting means of the multi-aperture imaging device and a movement of the array lenses, an overall lower resulting installation height may be obtained for the different deflection positions of the beam-deflecting means, leading to a lower size of an overhang of the beam-deflecting means with respect to the optics.

According to an embodiment, a multi-aperture imaging device includes an image sensor, an array of optical channels, wherein each optical channel includes an optic for imaging a partial field of view of a total field of view onto an image sensor region of the image sensor, and a beam-deflecting means switchable between a first rotational position and a second rotational position by executing a switching movement, and configured to deflect, in a first rotational position, optical paths of the optical channels into a first viewing direction and to deflect, in a second rotational position, the optical paths of the optical channels into a second viewing direction. The array is configured to execute based on the switching movement an adjustment movement for adjusting an orientation of the array with respect to the beam-deflecting means.

Further embodiments relate to an imaging system, a method for providing a multi-aperture imaging device and a method for capturing an object region.

BRIEF DESCRIPTION OF THE DRAWINGS

Embodiments of the present invention will be detailed subsequently referring to the appended drawings, in which:

FIG. 1b shows a schematic side sectional view of the multi-aperture imaging device of FIG. 1a with a first rotational position of a beam-deflecting means;

FIG. 1c shows a schematic side sectional view of the multi-aperture imaging device of FIG. 1a in a theoretical state and with a second rotational position of a beam-deflecting means;

FIGS. 3a-d show schematic side sectional views of a device according to an embodiment, wherein the beam-deflecting means is movable out of a housing of the device;

FIG. 15 shows a schematic flow diagram of a method for capturing an object region according to an embodiment.

DETAILED DESCRIPTION OF THE INVENTION

Figure 1A:
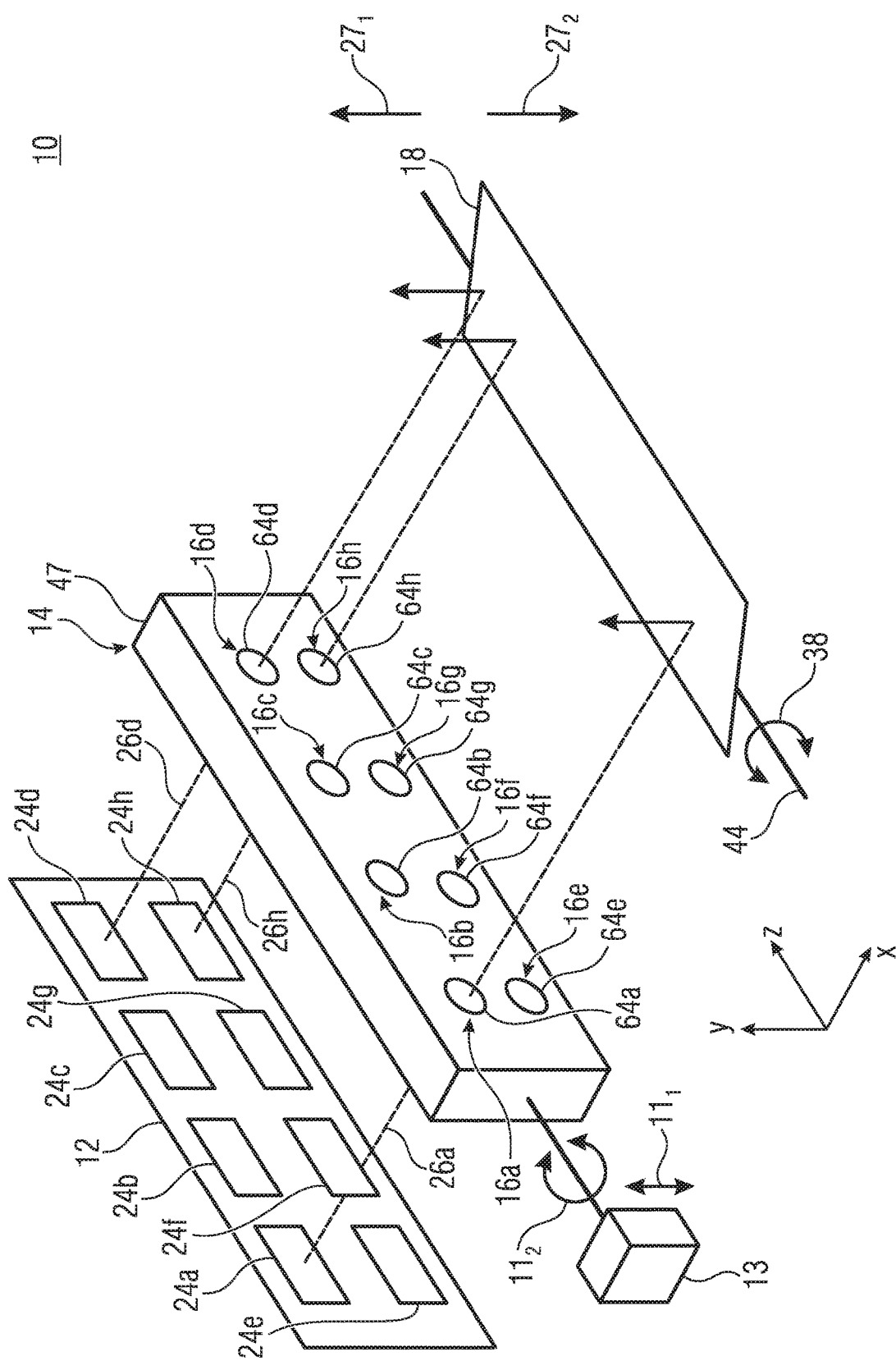
FIG. 1a shows a schematic perspective view of a multi-aperture imaging device according to an embodiment.

Before embodiments of the present invention will subsequently be described in detail with reference to the drawings, it shall be pointed out that identical, functionally identical and operatively identical elements, objects and/or structures are provided in the different figures with identical reference numerals so that the description of these elements in different embodiments is interchangeable and/or mutually applicable.

Subsequent embodiments refer to multi-aperture imaging devices. Multi-aperture imaging devices may be configured to capture by means of a plurality or multitude of apertures a total field of view (total object region) by capturing several partial fields of view (partial object regions) that partially and incompletely overlap each other. For this, the multi-aperture imaging device may include an image sensor, an array of optical channels and a beam-deflecting means.

The image sensor may comprise several image sensor regions onto each of which a partial field of view is imaged. The image sensor may be configured to output an analog or digital image sensor signal based on the captured partial field of view. The image sensor regions may be part of an integral image sensor and/or may at least partially be mechanically decoupled from other image sensor regions (multi-piece image sensor). e.g., to enable an individual movement of the image sensor region for one, several or all image sensor regions.

The array of optical channels may be implemented as a single-line or multi-line sequence of optical channels. Each optical channel includes an optic for imaging one of the partial fields of view onto an image sensor region of the image sensor. Each of the optics may include one or several optic elements such as lenses, diffractive elements, refractive elements, diaphragm elements or the like. For example, several optic elements may together form an optic stack forming at least a part of the optic of the optical channel. Optic elements of an optic stack may be supported with respect to each other by a mutual stack carrier or lens carrier and/or with respect to an optional carrier or the substrate. The stack carrier or lens carrier may enable between the optic elements a distance which is constant or variable by means of a force element (actuator), e.g., for setting an imaging function of the optic and/or a focus.

The optical channels of the array of optical channels may be arranged in a single-line or a multi-line manner, wherein a line of the array may be formed such that the optical channels of a line are essentially arranged along a straight line determined by the outer optical channels of the line. In this case, essentially may be understood such that a deviation from the course of the line of at most 15%, at most 10%, or at most 5% is admissible.

The optics of different optical channels may be formed to be identical or to be different in order to obtain an imaging function that is identical or channel-individual with respect to some, several or all optical channels. The optics of the optical channels may be connected in groups, having at least one, several or all optics per group of optical channels, with a substrate to obtain a support and/or movement of the group of optics. Several optics of a group of optical channels may be individually connected to the substrate or may comprise in sub-groups with at least one, several or all optics of the optics of the group of optical channels a mutual carrier at which the optics of the sub-group of optics are arranged and which enables an arrangement of the optics with respect to the substrate. At least for the wavelength range to be captured by the multi-aperture imaging device, the carrier may be formed to be transparent in pass bands to an extent of at least 50%, at least 70%, at least 90% or even at least 98%. In the pass bands, optical paths of the optical channels may pass through the transparent carrier. Beside the pass bands, the carrier may also be formed to be transparent; however, may alternatively also be formed to be less transparent or to even be opaque for at least a part of the wavelength range in order to provide filtering or a diaphragm function, e.g., for suppressing stray light. Such a carrier enables holding and/or moving the optics of the group of optical channels together with respect to the substrate so that the movement is possible with a high precision and/or holding is possible with a smaller number of elements.

The carrier may be directly connected to the substrate. Alternatively or additionally, the carrier may be connected to another component, e.g., to the image sensor and/or to a housing for receiving the optics and/or the image sensor and/or the beam-deflecting means.

This means that the optics and/or the carrier may be suspended at the substrate. For example, the optics and/or the carrier may be directly supported at the substrate in a movable manner or in an immovable manner, or may be indirectly supported via an actuator, for example. Also, the optics of one, several or all optical channels and associated image sensor regions may be mechanically coupled to each other, e.g., at, on or in a travel carriage for mutually moving the components. The travel carriage may provide a mechanical connection between the housing 23 and the beam-deflecting means 18 and may optionally also provide a mechanical connection to the image sensor 12 and/or the array 14, which means that it includes said components. The travel carriage may comprise a housing.

The beam-deflecting means may be configured to guide the optical paths of the optical channels from a direction between the image sensor and the optics towards the total field(s) of view. For example, the beam-deflecting means may be configured to guide the optical paths in a temporally alternating manner in a first position into a first direction towards a first total field of view and in a second position into a second direction towards a second total field of view. Alternatively, parallel capturing of the first and second total fields of view may be carried out, e.g., by providing a number of optical channels for simultaneously capturing the partial fields of view of the first total field of view and the partial fields of view of the second total field of view as well as deflecting a first number of optical channels towards the first total field of view and a second number of optical channels towards the second total field of view.

Deflecting an optical path of an optical channel may occur in beam-deflecting regions. The beam-deflecting means may be formed as a mirror, wherein the mirror may be configured in a planar manner across several or all beam-deflecting regions. For example, the optical paths of the optical channels may be provided in a course from the image sensor to the beam-deflecting means with a two-dimensional divergence or deflection of the viewing direction so that the optical channels are deflected by identical deflection into partial fields of view distributed in the total field of view in a two-dimensional manner. Alternatively, the beam-deflecting means may be formed such that at least two portions of the beam-deflecting means are inclined towards each other along at least one direction in order to completely or partially implement a deflection or divergence of the optical channels into the at least one direction in the total field of view-so that the optical channels may be provided with a direction divergence to a lower extent in a region between the image sensor and the beam-deflecting means along the corresponding direction, or may even extend in parallel.

The portions may comprise beam-deflecting regions for one or several optical channels and may be referred to as facets. For example, one facet may be provided per optical channel; however, facets of several optical channels may also be used. Each optical channel may be assigned to a facet. When considering the case in which the beam-deflecting means comprises only one facet, this may be implemented as a planar mirror.

The beam-deflecting means may be configured to guide, in the first position, the optical paths with a first main side or mirror side of the beam-deflecting means into the first direction and to guide, in the second position, the optical paths with the first main side or mirror side into the second direction. Alternatively, the beam-deflecting means may be configured to guide, in the second position, the optical paths with a second main side or mirror side into the second direction. Switching between the first position and the second position may be carried out by a translational and/or rotational movement of the beam-deflecting means. With a translational movement, the beam-deflecting means may comprise a first axial portion that enables a deflection of the optical paths into the first direction, and comprise a second axial portion that enables a deflection of the optical paths into the second direction. In order to switch between the first position and the second position, the beam-deflecting means may be moved in a translational manner along an axial direction along which the axial portions are arranged, e.g., in parallel to a line-extension direction of the array.

For using a rotational movement, the beam-deflecting means may comprise in the first direction a first tilt angle of a reflecting plane or faceted main side to the array in order to deflect the optical paths into the first direction, and may comprise in a second position a second tilt angle, e.g., rotated by 90° with respect to the first tilt angle, to deflect the optical paths into the second direction. This may lead to a situation in which a surface normal of the main side of the beam-deflecting means points in parallel to a direction between the optics of the array and the beam-deflecting means. In this orientation, perpendicularly to the direction and perpendicularly to a line-extension direction of the array, an installation space requirement of the beam-deflecting means may be high or at a maximum. The beam-deflecting means may comprise two reflecting main sides and may be formed to be reflective on both sides, e.g., as a planar or faceted mirror formed to be reflective on both sides. The beam-deflecting means may be configured to deflect, in the first position, the optical paths with a first one of the main sides into the first direction and to deflect, in the second direction, the optical paths with a second one of the main sides into the second direction. This enables to switch between the first and second positions with a low rotational switching angle, i.e., a low actuator travel, enabling fast and energy efficient switching. Furthermore, the position in which the surface normal is parallel to a direction between the array and the beam-deflecting means may be avoided so that a smaller installation height may be obtained. The main sides may be in parallel or tilted towards each other.

The beam-deflecting means may be suspended at a substrate and may be translationally and/or rotationally supported. For example, the beam-deflecting means may be directly or indirectly supported at the substrate. e.g., via an actuator.

Some of the embodiments described herein refer to a movement of components such as the array of optical channels, the beam-deflecting means, the optics or the image sensor. Controllable actuators may be used for obtaining such a movement. This may be done using pneumatic, hydraulic, piezoelectric actuators, DC motors, stepper motors, thermal actuators, electrostatic actuators, electrostrictive and/or magnetostrictive actuators or drives, unless otherwise described.

FIG. 1a shows a schematic perspective view of a multi-aperture imaging device 10 according to an embodiment. The multi-aperture imaging device 10 includes an image sensor, an array of optical channels 16a-h and a beam-deflecting means 18. Each optical channel 16a-h includes an optic 64a-h for imaging a partial field of view of a total field of view onto an image sensor region 24a-h of the image sensor 12. The optical channels 16a-h may be understood to be a course of optical paths 26a-h. The optical paths 26a-h schematically refer to center beams of the total optical paths, which means that each center beam is assigned a bundle of beam having edge beams. The optical paths 26a-h may be influenced by the respective optic 64a-h arranged in the array 14, e.g., through scattering or concentration. The individual optical channels 168a-h may each form or include a complete imaging optic and may comprise at least one optical component, or optic, e.g., a refractive, diffractive or hybrid lens, and may image a section of the total object captured with the multi-aperture imaging device. This means that one, several or all of the optics 64a-h may also be a combination of optic elements. An aperture diaphragm may be arranged with respect to one, several or all of the optical channels 16a-h.

The optics 64a-h may be arranged at a carrier 47 individually, in groups or together in a direct manner or by means of a lens holder. The carrier may be an element that is formed at least locally in a region of the optical paths in a transparent manner, e.g., a glass carrier. Alternatively or additionally, the array 14 may also comprise a housing in which the optics 64a-h are arranged, wherein, optionally, the image sensor 12 may also be arranged in the housing. Alternatively, the arrangement of the carrier 47 may also be omitted, e.g., if the optics 64a-h are suspended at a substrate. Such a substrate may be immovable, while it is also possible to implement the substrate to be movable, e.g., to enable a movement of the optics 64a-h for image stabilization and/or focusing.

For example, the image sensor regions 24a-h may each be formed of a chip including a corresponding pixel array, wherein the image sensor regions 24a-h may be mounted onto a mutual substrate, or a mutual circuit carrier, such as a mutual circuit board or a mutual flex board. Alternatively, it would obviously also be possible to form each of the image sensor regions 24a-h of a respective part of a mutual pixel array, which continuously extends across the image sensor regions 24a-h, wherein the mutual pixel array is formed on an individual chip, for example. In this case, e.g., only the pixel values of the mutual pixel array are read out in the image sensor regions 24a-h. Different mixtures of these alternatives are obviously also possible, e.g., the presence of a chip for two or more optical channels and of a further chip for other optical channels or the like. In the case of several chips of the image sensor 12, these may, e.g., be mounted on one or several boards or circuit carriers, e.g., together or in groups or the like.

The beam-deflecting means 18 is configured to deflect the optical paths 26a-h of the optical channels 16a-h. For this, e.g., the beam-deflecting means 18 may comprise a reflecting main side facing the optics 64a-h, or the array 14, and inclined thereto, i.e., comprising a rotational position. Due to the inclination, the optical paths 26a-h may be deflected into a viewing direction $27_1$, wherein the viewing direction $27_1$ may describe a relative direction with respect to the multi-aperture imaging device 10, along which the object region to be captured is arranged. As is subsequently explained in detail, the beam-deflecting means 18 may be switchable between the illustrated first rotational position and a second rotational position, e.g., by executing a switching movement. The switching movement may include a rotational movement 38 about a rotation axis 44 of the beam-deflecting means 18. Thus, based on the rotational movement 38, at least the first rotational position or position and the second rotational position or position of the beam-deflecting means 18 may be obtained. In the different rotational positions, the optical paths 26a-h of the optical channels 16a-h may be deflected into different viewing directions $27_1$ and $27_2$, respectively. For this, the multi-aperture imaging device 10 may include an actuator (not illustrated) which may provide the rotational movement, or the switching movement.

The array 14 is configured to execute, based on the switching movement 38, an adjustment movement 11 for adjusting an orientation of the array 14 with respect to the beam-deflecting means 18. For this, the multi-aperture imaging device 10 may include an actuator 13 configured to provide a translational adjustment movement $11_1$ and/or a rotational adjustment movement $11_2$ of the optics 64a-h. This means that the actuator 13 may provide the adjustment movement 11, wherein this may comprise mutually moving all of the optics 64a-h of the array 14, e.g., by moving the carrier 47 and/or a housing. Alternatively, the optics 64a-h may also be moved individually, e.g., if they are individually arranged or supported at a substrate. The adjustment movement may be executed together with the image sensor 12, which means that, according to an embodiment, the image sensor 12 may be moved together with the optics 64a-h of the array 14 in the context of the adjustment movement 11. Optionally, actuators of a focusing means for providing an autofocus may be moved along by generating a relative movement between the array 14 and the image sensor 12 along an axial direction of the courses of the optical paths and/or actuators of an optical image stabilizer.

The adjustment movement 11 makes it possible to arrange overhangs of the beam-deflecting means 18, which are needed due to basic geometric conditions, with respect to the array 14 along a thickness direction y, which is perpendicular to an axial direction x between the image sensor 12 and the array 14 and perpendicular to a line-extension direction z of the array 14, in the space in such a manner that a thickness (dimension) of the multi-aperture imaging device along the y direction is smaller than in an immovable arrangement of the array 14.

In this case, the adjustment movement 11 may be differentiated from other movements, e.g., from movements for focusing which, e.g., change a distance between the array 14 and the image sensor 12. This means that the adjustment movement occurs in the absence of a translational distance change between the array 14 and the image sensor 12 along a direction parallel to an extension of the optical channels between the image sensor 12 and the array 14, i.e., along the direction x. However, this is not to be understood as limiting in such a way that the adjustment movement may not be combined or overlapped with a movement for focusing, which is intended in embodiments. However, this is the overlap of two or several movements, the adjustment movement being one of them. The adjustment movement itself and exclusively may then be executed while maintaining the distance.

A plurality or multitude of partial fields of view of a total field of view may be captured by the optical channels, wherein each partial field of view may be captured by at least one optical channel 16a-h. Thus, each optical channel may be assigned a partial field of view which may be captured with the optical channel. For example, each partial field of view may, starting from the multi-aperture imaging device 10 and/or the beam-deflecting means 18, be assigned a direction in which the respective optical path 26a-h of the optical channel 16a-h is deflected with the beam-deflecting means 18.

FIG. 1b shows a schematic side sectional view of the multi-aperture imaging device 10, wherein a sectional plane through the image sensor regions 24a and 24e as well as the optics 64a and 64e is exemplarily illustrated. The inclination of the beam-deflecting means 18 with respect to the optical paths 26a and 26e for deflecting the same may lead to the fact that the beam-deflecting means 18 comprises a variable, i.e., increasing or decreasing, distance along the x direction and with respect to the optics 64a and 64e along the thickness direction y. The diverging beams of the optical paths of the optical channels strike the beam-deflecting means 18 to an extent of at least 90%, at least 95%, or at least 99.5%, ideally 100%. Each of the optical channels of the array 14 and, thus, the combination of several optical channels across several lines may comprise a divergence of the optical paths, as is indicated by the edge beams 15 of the array 14, for example. The divergence or beam expansion along the x direction in combination with the inclination of the beam-deflecting means 18 leads to the fact that, additionally to a dimension A of the multi-aperture imaging device 10 that is attributable to the image sensor 12 and the array 14, an overhang B or $B_1$ of the beam-deflecting means 18 with respect to the optics 64a to 64e and/or of the image sensor 12 is needed to completely deflect the optical paths of the optical channels. An incomplete deflection may lead to a loss of image quality.

For the illustrated orientation of the beam-deflecting means 18, this results in a total installation space requirement for the multi-aperture imaging device 10 of A and additionally B (A+B) in order to deflect the optical paths 26a and 26e into the viewing direction $27_1$.

FIG. 1c shows a schematic side sectional view of the multi-aperture imaging device 10 in a theoretical state in which the beam-deflecting means 18 executes the rotational movement 38 for switching between the viewing direction $27_1$ and the viewing direction $27_2$ of the multi-aperture imaging device 10, which means that the beam-deflecting means 18 is rotated about the rotation axis 44, for example. The viewing directions $27_1$ and $27_2$ are arranged to be reversed or antiparallel towards each other in a tolerance range of ±30°, ±15°, or ±5°. Along the thickness direction y, an overhang of the multi-aperture imaging device 10 is now needed along the other direction, or viewing direction $27_2$. In the unmoved state of the array 14, a first overhang $B_1$ along the first viewing direction $27_1$ and a second overhang $B_2$ along the second viewing direction $27_2$ is needed for providing both viewing directions $27_1$ and $27_2$, wherein $B_1=B_2$ may apply in the symmetrical case.

Figure 1D:
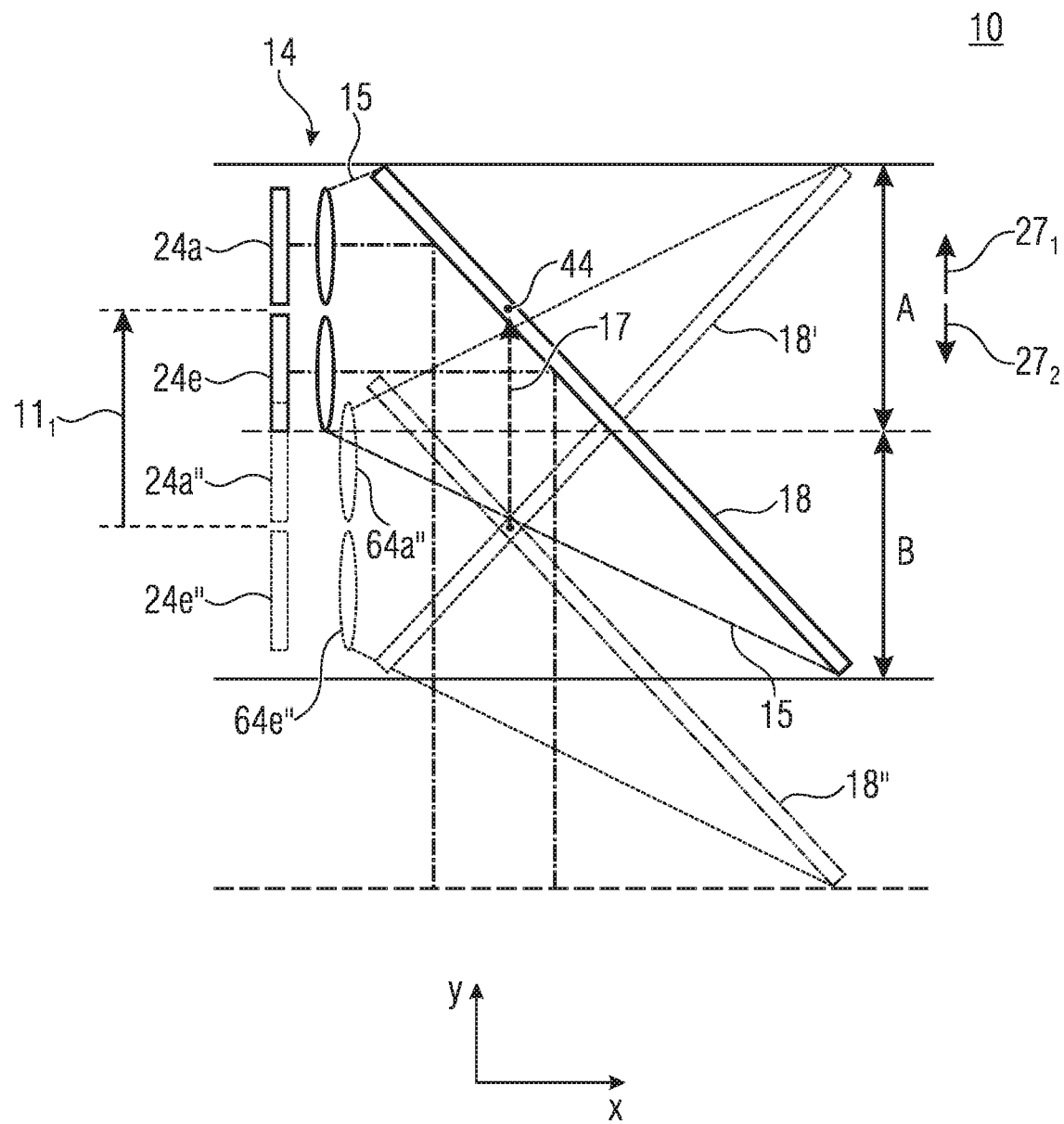
FIG. 1d shows a schematic side sectional view of the multi-aperture imaging device of FIG. 1a in an inventive state and with the second rotational position of a beam-deflecting means, wherein an array of optical channels has executed a translational adjustment movement.

FIG. 1d shows a schematic side sectional view of the multi-aperture imaging device 10 according to an embodiment, wherein the array 14 has executed the adjustment movement $11_1$ along the y direction. For example, the image sensor regions 24a and 24e may also be moved to maintain a constant relative position of the array 14 to the image sensor 12. This means that the vertical position of the image sensor, the array optic and, thus, the optical axes may be variable. Alternatively, by using other measures such as an additional beam deflection between the array 14 and the image sensor 12 and/or a redundant implementation of the image sensor 12 in terms of size, a movement of the image sensor 12 may be omitted.

In combination with the lateral adjustment movement $11_1$, the beam-deflecting means 18 may also be moved laterally in parallel to the y direction. An extent of a movement 17 of the beam-deflecting means 18 in connection with the adjustment movement 11 may be equal to an extent of the adjustment movement $11_1$ in a tolerance range of 20%, 10% or 5%. The switching movement between the beam-deflecting means 18 for switching between the viewing direction $27_1$ to the viewing direction $27_2$ may therefore include the rotational movement 38 and, additionally, the translational movement 17 of the beam-deflecting means 18 along the movement direction y. The adjustment movement $11_1$ may include a further translational movement relating to the array 14. The array 14 may move along the same movement direction as the beam-deflecting means 18. For example, during the switching movement for switching to the second viewing direction $27_2$, the adjustment movement $11_1$ and the translational movement 17 may be executed along the other viewing direction $27_1$. As is illustrated by the image sensor regions 24"a and 24"e as well as the optics 64"a and 64"e as well as the beam-deflecting means 18", which show an unchanged position of the components in accordance with FIG. 1c, an installation space requirement of the multi-aperture imaging device 10 may be saved along the thickness direction y up to the extent of an overhang $B_1$ or $B_2$ compared to the theoretical state of FIG. 1c.

If the optical paths of the array 14 are each deflected in a symmetrical manner about the viewing direction before striking onto the beam-deflecting means 18, e.g., as may be the case if the viewing directions $27_1$ and $27_2$ comprise an angle of 180° with respect to each other and the array 14 is arranged at an angle of 90° with respect to the viewing directions $27_1$ and $27_2$, a position or lateral dimension of the beam-deflecting means 18 along the thickness direction y may be identical or at least identical to an extent of at least 20%, at least 80%, or at least 90% in the rotational positions for deflecting the optical paths into the viewing directions $27_1$ and $27_2$. This means that a projection of the beam-deflecting means into a plane in parallel to the line-extension direction, e.g., in parallel to a course of the optical path between the image sensor 12 and the array 14 or in parallel to a main side of the image sensor 12, is identical in both rotational positions in this extent (overlaps) and is congruent when 100% identical.

In the illustrated case of the translational adjustment movement $11_1$, the saving in installation space requirement may be described by the shift of the beam-deflecting means 18 through the translational movement 17, which makes it possible that a part of a movement range of the beam-deflecting means that is needed due to the switching movement is reduced compared to the immovable array according to FIG. 1c, since the installation space is used several times, whereas in the theoretical state of FIG. 1c each overlap $B_1$ and $B_2$ is arranged in an individual installation space to be provided for this. The adjustment movement may be understood to be a movement of the array 14 that is adjusted to this lateral movement 17. Thus, the array 14 may be moved to adjust a relative position between the array 14 and the beam-deflecting means 18. The same may also be obtained by generating a rotational movement of the array 14, as is discussed below.

Thus, a needed installation height and/or a dimension of the multi-aperture imaging device 10 within a housing may fulfill the condition that a thickness D is smaller than a height of the arrangement of the image sensor 12 and the array 14 and twice an overhang B, which means that the following may apply:

$$D<A+2B$$

Figure 1E:
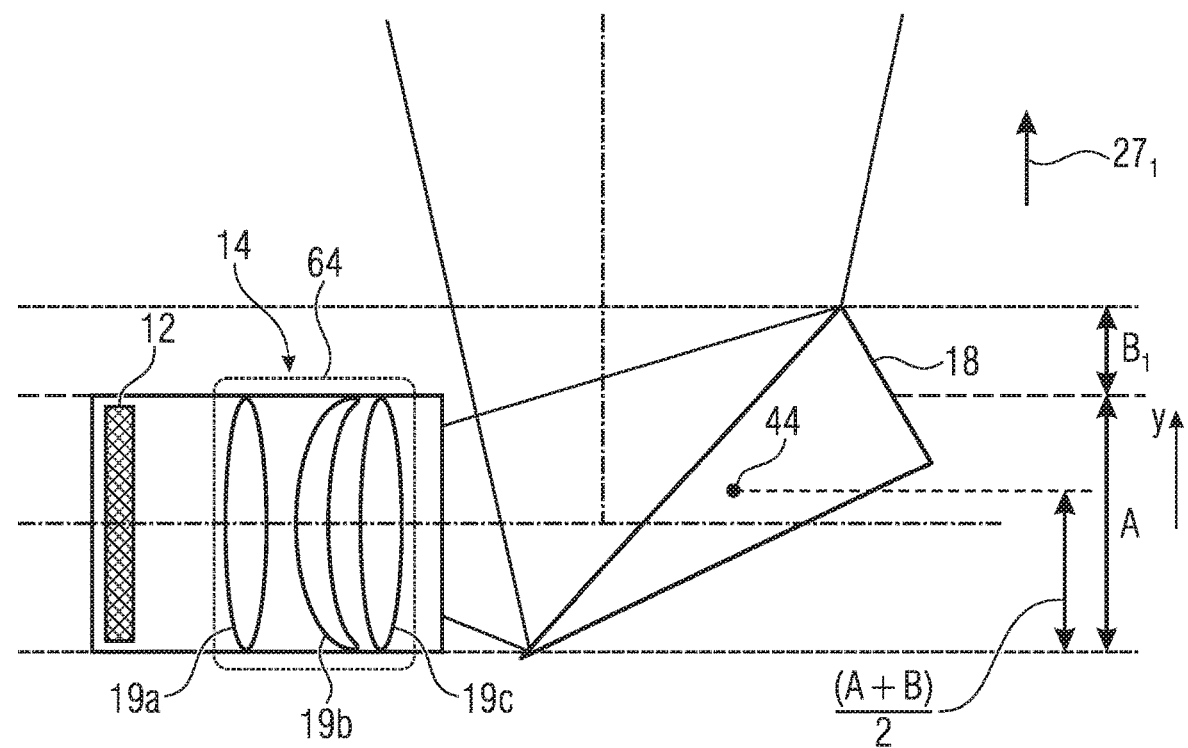
FIG. 1e shows a schematic side sectional view of a modified multi-aperture imaging device with to a single-line array with a first viewing direction according to an embodiment.
Figure 1F:
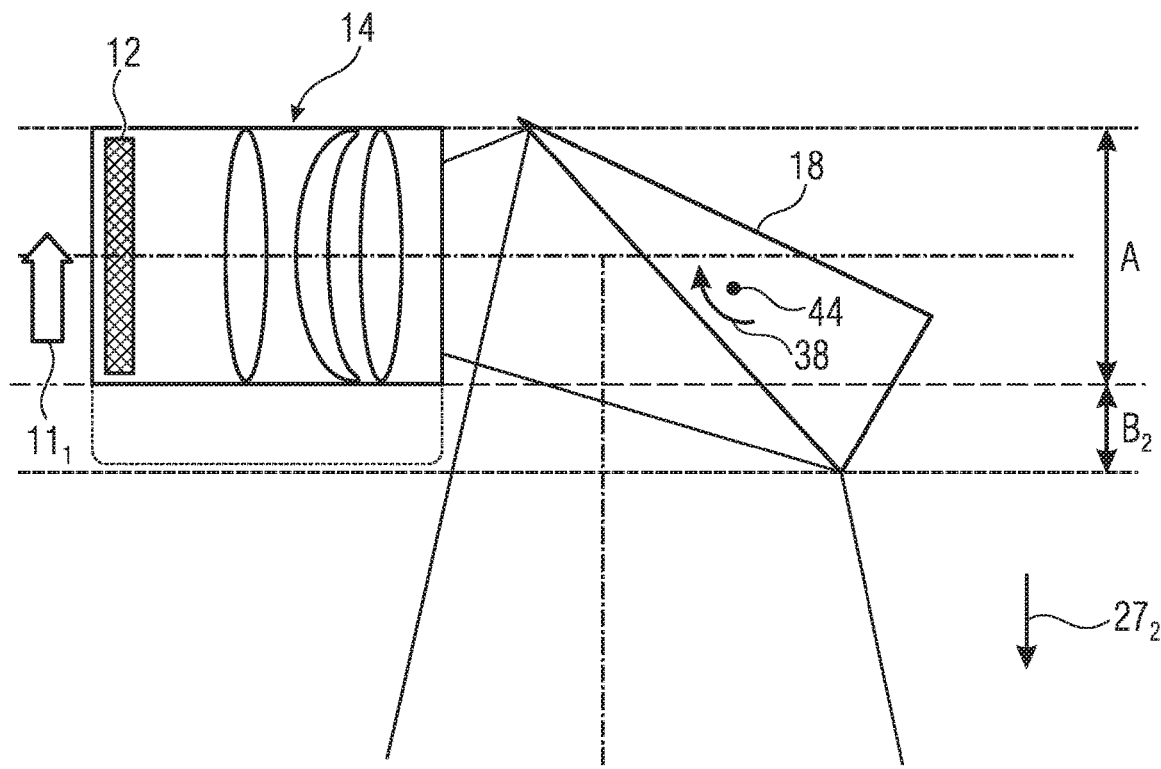
FIG. 1f shows a schematic side sectional view of the multi-aperture imaging device of FIG. 1e with a second viewing direction according to an embodiment.

FIG. 1e and FIG. 1f show a schematic perspective view of a multi-aperture imaging device 10' in a first rotational position and a second rotational position. Beside other modifications with respect to the multi-aperture imaging device 10 which are explained in connection with FIG. 2a to FIG. 2c, the array 14 is formed in a single-line manner, which means that the optics 64 of the array 14 are located in a single line. The optics 64 may be mechanically connected to each other via a carrier and/or a lens holder so that a mutual movement of the optics 64 in the array 14 is possible by a movement/actuation of the array 14. Alternatively, each optic 64 or lens 19a-c of the same may be supported and/or moved individually. Combinational solutions are also possible, e.g., wherein a mutual carrier and/or a connected lens holder is implemented in order to obtain a mutual movement of the optics 64. For example, this may occur in a travel carriage or the like. Additionally, further actuators may be provided, enabling a channel-individual movement of the lenses, e.g., for providing channel-individual focusing. It is understood that channel-global focusing may also be obtained through a mutual movement of ail lenses without modification.

According to an embodiment, the beam-deflecting means 18 may be configured to execute during the switching movement only a rotational movement 38 about a rotation axis 44. In this case, the rotation axis or rotational axis 44 may be arranged in the thickness direction y in the center of the y-expansion of the facet, or beam-deflecting means, i.e., at (A+B)/2, for example, A+B referring to the total expansion of the beam-deflecting means 18 along the thickness direction y. In a non-tilted normal position of the array 14, the thickness direction y may be arranged perpendicular to a line-extension direction of the array 14 and perpendicular to a course of the optical paths between the image sensor 12 and the array 14. Centering the rotation axis 44 onto the center may be carried out as accurately as possible, however, is still advantageous within a tolerance range of 20%, 10%, or 5%. This means that the switching movement is executed, e.g., exclusively by the rotational movement 38, wherein a rotational axis of the rotational movement 38 along a thickness direction of the multi-aperture imaging device may be centered within a tolerance range of 20% with respect to a largest expansion of the beam-deflecting means 18 along the thickness direction y.

FIG. 1f illustrates the multi-aperture imaging device 10' after executing the adjustment movement $11_1$. The beam-deflecting means 18 has been moved accordingly, as is described in connection with FIG. 1d. An overhang $B_2$ may also be arranged along the second viewing direction $27_2$. $B_1=B_2=B$ may apply, e.g., in a symmetrical implementation of the multi-aperture imaging device 10'. A total installation space requirement A+B may be low, since a single overhang may be sufficient, which may be less compared to a double provision according to FIG. 1a. This means that the switching movement includes a rotational movement 38 of the beam-deflecting means 18, wherein the adjustment movement 11 includes a translational movement $11_1$ of the array 14 along a movement direction/thickness direction y which is perpendicular to a line-extension direction z and parallel to a thickness direction y of the multi-aperture imaging device.

Figure 2A:
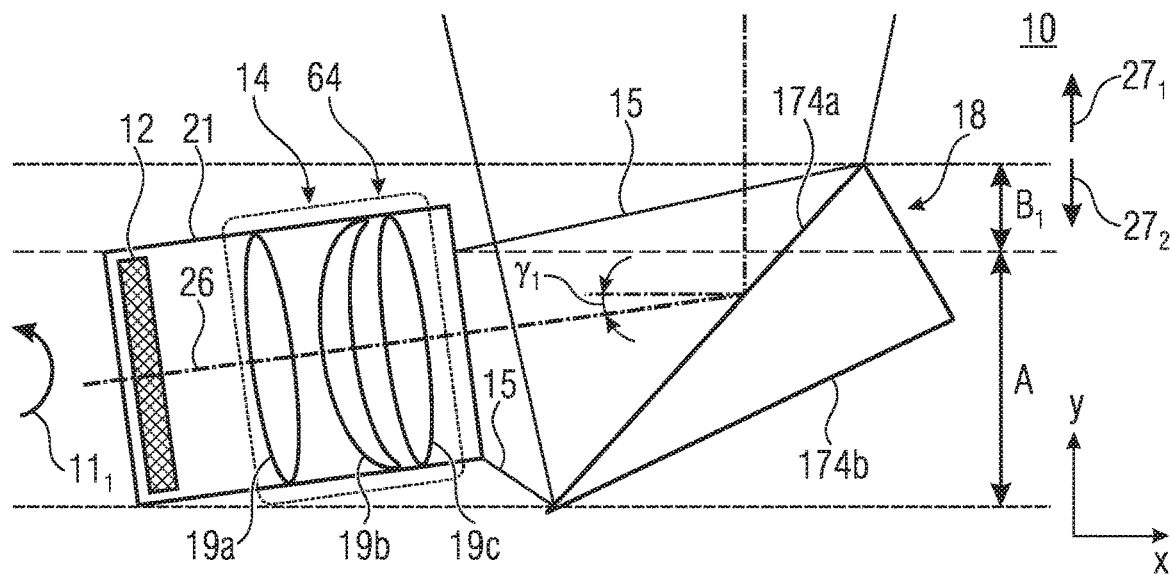
FIG. 2a shows a schematic side sectional view of a multi-aperture imaging device according to an embodiment and a first rotational state of the beam-deflecting means.

FIG. 2a shows a schematic side sectional view of the multi-aperture imaging device 10', which is again described and which comprises several changes compared to the multi-aperture imaging device 10, which may each be implemented optionally and individually and independently. The array 14 may be formed as a single-line array, which, in view of FIG. 1a, may be understood as the arrangement solely of the optics 64a to 64d or any other number of optics in an individual and single line, for example. Furthermore, an optic 64 may comprise a plurality of optic elements 19a, 19b and/or 19c which are used together for the beam formation. The array 14 and the image sensor 12 may be arranged in a mutual housing to enable a mutual movement of the array 14 and the image sensor 12. Furthermore, the beam-deflecting means 18 may be formed as an individual or a plurality of facets comprising main sides 174a and 174b that are inclined towards each other.

The multi-aperture imaging device 10' is solely selected for a better presentation. Alternatively, the multi-aperture imaging device 10 may also be used, and without any limiting effects, for the description in connection with the adjustment movement $11_2$. In FIG. 2a, through to the orientation of the beam-deflecting means 18, the multi-aperture imaging device 10' is implemented such that capturing along the viewing direction $27_1$ is possible.

Figure 2B:
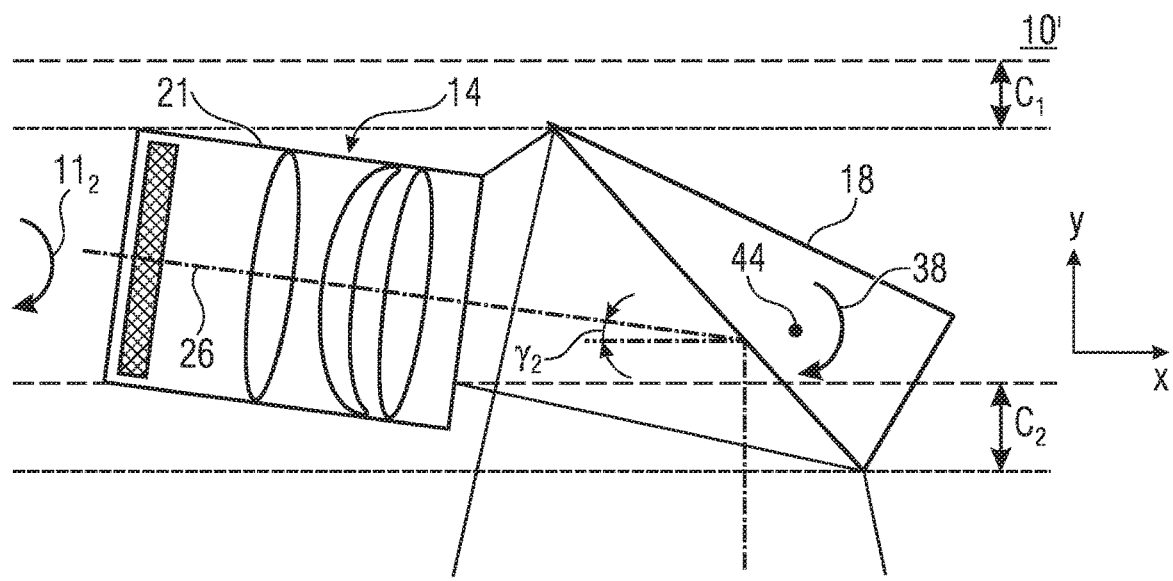
FIG. 2b shows a schematic side sectional view of the multi-aperture imaging device of FIG. 2a according to an embodiment in a second rotational state of the beam-deflecting means, wherein an array of optical channels has executed a rotational adjustment movement.

In FIG. 2b, the beam-deflecting means 18 is rotated with the rotational movement 38 about the rotation axis 44. For example, this may take place in the clockwise direction. The adjustment movement $11_2$ also includes a rotational movement of the array 14, e.g., by moving the housing 21. In FIGS. 2a and 2b, the adjustment movement $11_2$ may lead to the fact that, with respect to a symmetrical viewing direction of the array 14 before striking onto the beam-deflecting means 18, as is illustrated in FIGS. 1b, 1c and 1d, for example, a pre-inclination of the optical paths 26 is obtained so that these strike at an angle $y_1$ and/or $y_2$ with respect to the reference direction, e.g., in parallel to the x-direction, so that a deflection of the optical paths 26 by means of the beam-deflecting means 18 may be less as compared to a course of the center beams of the optical paths 26 in parallel to the x-direction.

For example, the array 14 and the image sensor 12 may be mechanically coupled to each other via the housing 21 and may be configured to mutually execute the adjustment movement 11. The housing 21 may be referred to as a travel carriage or the like. This may also be understood such that, instead of a total influence of the viewing direction by means of the beam-deflecting means 18, part of switching the viewing directions $27_1$ and $27_2$ may be obtained by a movement of the array 14. For example, if the viewing directions $27_1$ and $27_2$ are arranged to be opposite to each other and comprise an angle of 180°, and if the beam-deflecting means 18 is arranged by means of a mirror that is reflective on both sides with main sides that are arranged in parallel towards each other, as is illustrated in FIG. 1b, a rotation about 90° is needed in the configuration according to FIG. 1b in order to cause the switching movement. For example, this leads to an orientation of ±45' with respect to the x-direction. By applying the adjustment movement $11_2$ using the corresponding rotational movements of the array 14, this orientation or inclination may be reduced to 45°–$y_1$ or 45°–$y_2$ so that the overall rotational movement 38 may be reduced to 90°–($y_1$+$y_2$).

By using the main surfaces 174a and 174b, which are inclined towards each other, a further reduction is possible. By means of the pre-inclination of the optical paths 26 about the angles $y_1$ and $y_2$, a lower requirement for rotation of the beam-deflecting means 18 may be needed in order to switch between the viewing directions $27_1$ and $27_2$. This smaller range of rotation leads to a smaller overhang of the beam-deflecting means 18 with respect to the array 14, which is indicated with C. Even when using the beam-deflecting means 18 according to FIGS. 1a to 1d, B>C may apply. This means that the smaller size of the installation space requirement may be obtained along the y-direction by reducing the rotation range of the beam-deflecting means 18 by means of the adjustment movement $11_2$. This means that the switching movement from the first into the second rotational position may include the rotational movement 38 of the beam-deflecting means 18, and that the adjustment movement $11_2$ may include a further rotational movement. The two rotational movements may take place in the same direction, e.g., both in the clockwise direction or both in the counterclockwise direction. The sums of angles values by which the beam-deflecting means 18 is rotated through the rotational movement 38 and the array 14 is rotated through the adjustment movement $11_2$ may result in an angle sum of 90° within a tolerance range of 20%, 10%, or 5%.

Although overlaps $C_1$ and $C_2$ are needed along the positive y-direction and along the negative y-direction, respectively, these are small in comparison to the overlap B, $B_1$ or $B_2$, leading to an advantageous implementation. For example, the following may apply:

$$C=C_1=C_2>B=B_1=B_2$$

Thus, the dimensions of A+$C_1$+$C_2$ and A+2C, respectively, may also fulfill the following condition:

$$D<A+2B$$

Based on FIGS. 1a to 1d, 2a and 2b, implementations in which the adjustment movement 11 includes a translational movement $11_1$ or a rotational movement $11_2$ were exemplarily described According to embodiments, it is also possible to execute the adjustment movement 11 such that the translational movement $11_1$ and the rotational movement $11_2$ are executed. For example, a rotation of the array 14 may be implemented in FIGS. 1b and 1d, e.g., by the actuator 11. Alternatively or additionally, the array 14 and/or the housing 21 according to FIGS. 2a and 2b may additionally be moved with the adjustment movement $11_1$, e.g., in a positive y-direction when switching between the viewing direction $27_1$ and the viewing direction $27_2$. With this, a reduction of the remaining overlapping region may be obtained additionally to avoiding one of the two overlapping spaces $B_1$ or $B_2$ and $C_1$ or $C_2$, respectively.

This means that the switching movement from the first into the second rotational position includes a first rotational movement of the beam-deflecting means and a translational movement of the beam-deflecting means along a first movement direction, i.e., the rotational movement 38 and the translational movement 17. The adjustment movement may include a translational movement of the array along the movement direction, i.e., the adjustment movement $11_1$ and may additionally include a rotational movement, the adjustment movement $11_2$.

In other words, in addition to the rotational movement of the beam-deflecting means, the unit consisting of the image sensor and the array optic may be moved in order to achieve a different viewing direction of the multi-aperture camera. So far, the latter was stationary at least in the thickness direction. As a result of the needed inclined position of the mirror facet or of the mirror, the edge of the mirror facet facing away from the array optic projects beyond the lens array in the thickness direction and, thus, essentially determines the installation height. The edge facing the array optic projects to a smaller degree or not at all beyond the installation height, which predetermined by the lenses of the array optic. With regard to stationary optical axes of the array, the lenses form the distances ½ A+B in the thickness direction. A similar image results when switching the viewing direction by rotating the beam-deflecting means. With regard to the overall structure, an installation height of A+2B results for the desired realization of the two viewing directions. According to embodiments, in addition to the rotation of the beam-deflecting means, the unit consisting of the image sensors and the array optic is moved, which means that the adjustment movement 11 is executed. On the one hand, this may include a translational movement $11_1$ along the thickness direction, a rotational movement with the rotation axis in parallel to the line-extension direction, c.f. adjustment movement $11_2$, or a combination thereof. As a result, the needed installation height may be reduced to the value of up to A+B. In order to realize additional movements for implementing an autofocus and/or optical image stabilization, further drives may be arranged to move the unit consisting of the image sensors and the array optic. The multi-aperture imaging devices according to embodiments may be implemented without autofocus and/or image stabilization. Alternatively or additionally, the actuator 13 may be configured to provide a corresponding movement for focusing and/or image stabilization.

Figure 2C:
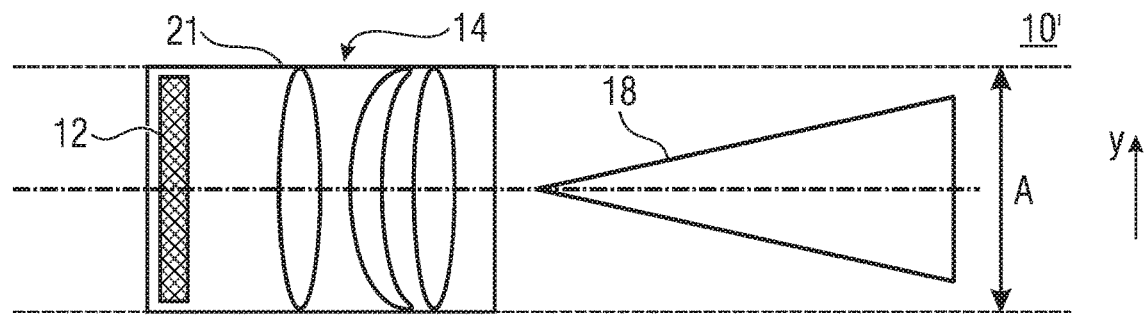
FIG. 2c shows a schematic side sectional view of the multi-aperture imaging device of FIG. 2a in a third rotational state of the beam-deflecting means according to an embodiment.

FIG. 2c shows a schematic side sectional view of the multi-aperture imaging device 10' in a third rotational position. e.g., which may be obtained during the switching movement and/or which may be obtained in an inactive state of the multi-aperture imaging device 10, e.g. during standby. In the illustrated rotational position, a dimension of the beam-deflecting means 18 along the thickness direction y may be smaller than or equal to a dimension of the housing 21 and/or the image sensor 12 and/or the array 14. This means that the thickness of the multi-aperture imaging device 10' is not determined by the beam-deflecting means 18 in this state. This enables storing the multi-aperture imaging device in a thin manner. This means that a rotational position and, thus, a vertical position of the image sensor, the array optic and, thus, the optical axes may be variable.

Figure 3A:
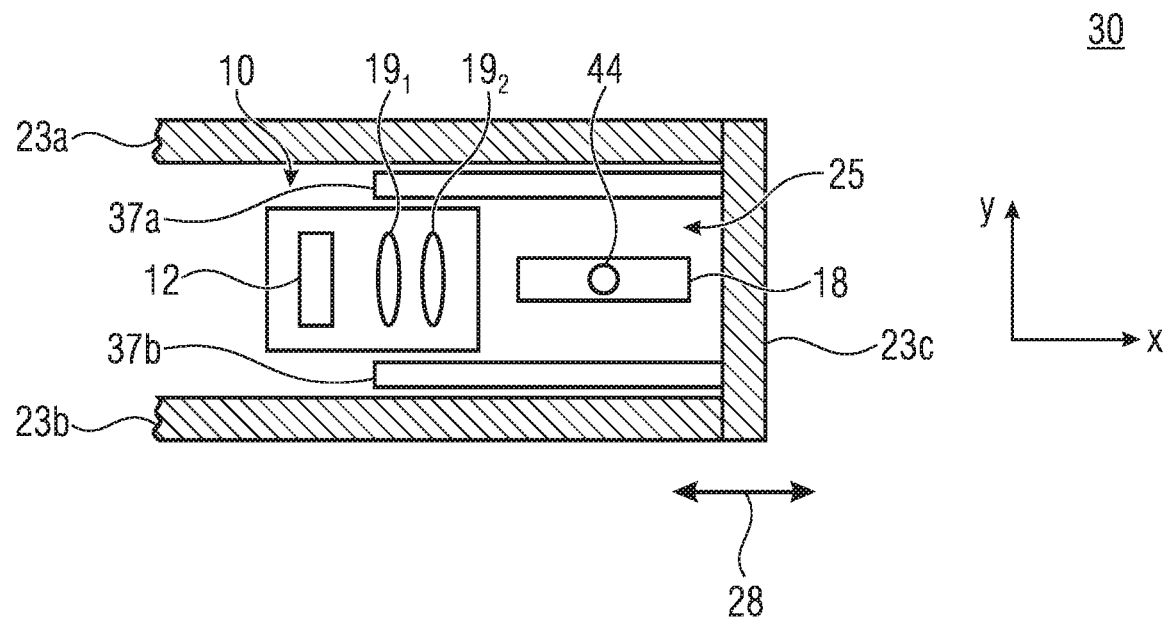

FIG. 3a shows a schematic side sectional view of a device 30 according to an embodiment. The device 30 comprises a first operation state in which the multi-aperture imaging device 10 is arranged within a housing 23 having side surfaces 23a, 23b and 23c, e.g., the side surfaces 23a and 23b being main sides, e.g., a front side and a back side. For example, the device 30 is a mobile telephone such as a smartphone or a tablet computer so that at least one of the main sides may comprise a display. The side surface 23c may be an auxiliary side and may be referred to as cover. By flipping open or moving the cover 23c, the multi-aperture imaging device 10 and/or the beam-deflecting means 18 may be completely or partially moved out of a housing volume 25 to enable a beam deflection outside of the housing volume 25 in order to obtain a second operation state in which the multi-aperture imaging device 10 captures images of fields of view, for example. In the first operation state, a beam-deflecting position may comprise a center position between the first and the second rotational positions, as is described in connection with FIG. 2c. The beam-deflecting means 18 comprises a first position within a housing.

The device 30 comprises at least partially transparent covers 37a and 37b which may be connected to the cover 23c. Thus, the covers 37a and 37b may be movable together with the beam-deflecting means 18 along a translational movement direction 28 so that the beam-deflecting means 18 is partially or completely moved out of the housing 23. The at least partially transparent covers 37a and 37b may be arranged in the illustrated first position at different sides of the beam-deflecting means 18 between the same and the housing 23. This means that the beam-deflecting means 18 may be arranged between the covers 37a and 37b.

In the first operation state, the covers 37a and 37b may be partially or completely arranged within the housing volume 25. For example, the covers 37a and 37b may be arranged at a travel carriage or may be transparent regions of the travel carriage. During the movements of the beam-deflecting means out of the housing 23 or into the housing 23, the array 14 and/or the image sensor 12 may remain stationary or may also be moved along the lateral movement direction 28 such that, e.g., a distance between the image sensor 12, the array 14 and the beam-deflecting means 18 remains unchanged. In this case, the travel carriage may also include the image sensor 12 and/or the array 14.

Figure 3B:
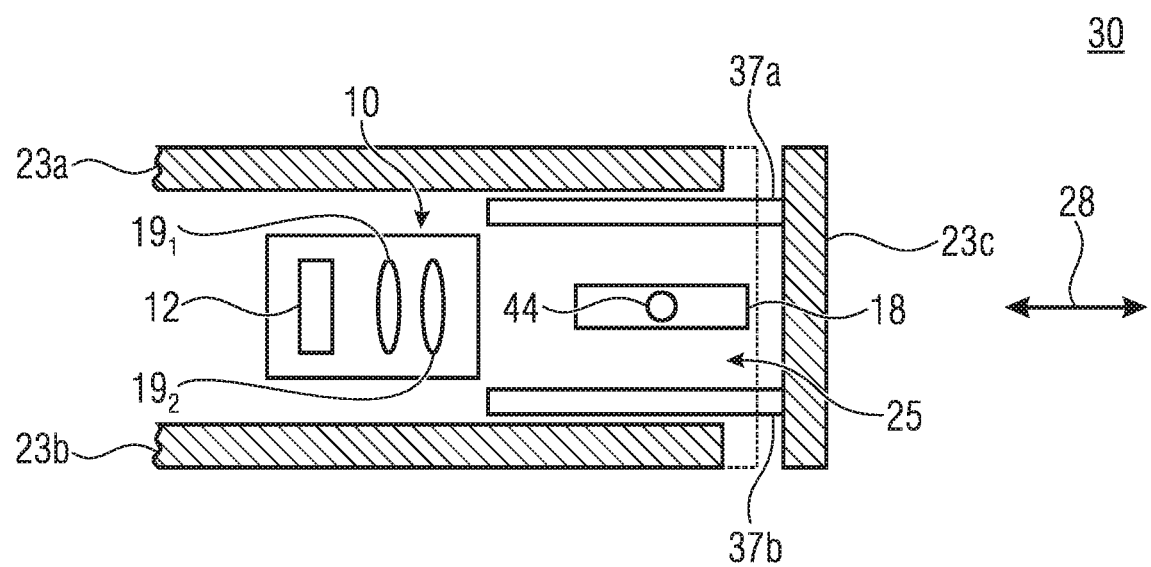

FIG. 3b shows a schematic side sectional view of the device 30, wherein the beam-deflecting means 18 comprises an intermediate position between the first position and the second position. For example, the intermediate position of the beam-deflecting means may be obtained during retraction or extension of the beam-deflecting means 18 into the housing volume 25 or out of the housing volume 25. The beam-deflecting means 18 is partially moved out of the housing volume 25.

FIG. 3c shows a schematic side sectional view of the device 30, wherein the beam-deflecting means 18 comprises the second position, i.e., the beam-deflecting means 18 is completely extended from the housing volume 25, for example. The at least partially transparent covers 37a and 37b comprise a distance $E_1$ towards each other which is smaller than a comparable distance between side surfaces 23a and 23b of the housing.

FIG. 3d shows a schematic side sectional view of the device 30, wherein a distance of the at least partially transparent covers 37a and 37b is enlarged in comparison to FIGS. 3a-c.

The at least partially transparent covers 37i and/or 37b may be movable along a translational movement direction facing away from the other at least partially transparent cover 37a and 37b, respectively, e.g., in parallel to the thickness direction y, i.e., along a positive or a negative y direction. The state of the at least partially transparent covers 37a and 37b illustrated in FIGS. 3a-c may be understood as a retracted or folded state. The state illustrated in FIG. 3d may be understood as a extended or unfolded state, wherein a distance $E_2$ between the at least partially transparent covers 37a and 37b is changed in comparison to the distance $E_1$, e.g., increased, i.e., $E_2 > E_1$ applies. For example, the distance $E_2$ may be larger than or equal to the distance between the comparable sides of the housing 23. The beam-deflecting means 18 is configured to deflect the optical paths of the optical channels such that they run through the at least partially transparent covers 37a and/or 37b.

In comparison to the first operation state of FIG. 3a or the state in FIG. 3b or FIG. 3c, the angle orientation of the beam-deflecting means 18 may be changed such that the area of the beam-deflecting unit used by the optical path of the multi-aperture imaging device increases in comparison to the first operation state, and the first rotational position or second rotational position is obtained. Alternatively or additionally, the increased distance $E_2$ may enable a larger range of the rotational movement 38. With the rotational movement 38, the beam-deflecting means 18 may be switchable at least between a first and a further rotational position, wherein each position may be assigned to a viewing direction of the multi-aperture imaging device. The rotation of the beam-deflecting means 18 may occur analogously or in a bistable manner or in a multi-stable manner. The rotational movement 38 for changing a viewing direction of the multi-aperture imaging device may be combined with a rotational movement of the beam-deflecting means 18 for an optical image stabilization. The covers 37a and/or 37b may encapsulate the other components of the multi-aperture imaging device.

The multi-aperture imaging device may carry out the switching movement and the adjustment movement within the distance $E_2$. Thus, for example, the extension of the covers 37a and 37b may provide a movement space for the array 14 and/or the image sensor 12 which may be small, according to the discussions of the FIGS. 1a-d and FIGS. 2a-c, based on the adjustment movement, also enabling a small expansion of the device 30 along the thickness direction.

The oppositely arranged covers 37a and/or 37b, or transparent regions thereof, may comprise a switchable diaphragm 33a and/or 33b so that the switchable diaphragm 33a-b is introduced, e.g., above and/or below or along any other direction of the beam-deflecting means. The diaphragm 33a-b may be switched according to the operation state or viewing direction of the camera. For example, a respective viewing direction of the multi-aperture imaging device which is not used may at least be partially closed by the diaphragm 33a-b in order to reduce an entry of stray light. For example, the diaphragms 33a-b may be mechanically moved or be electrochromic. The regions influenced by the diaphragm 33a-b may additionally be provided with a switchable diaphragm 33a-b that covers the optical structure in case the same is not used. The diaphragm 33a-b may be electrically controllable and may include an electrochromic layer (sequence). Alternatively or additionally, the diaphragm 33a-b may include a mechanically moved part. The movement may be carried out using pneumatic, hydraulic, piezoelectric actuators, DC motors, stepper motors, thermal actuators, electrostatic actuators, electrostrictive and/or magnetostrictive actuators or drives. In a state of the multi-aperture imaging device in which the viewing direction penetrates a diaphragm, the diaphragm 33a-b may be switched to allow the optical paths of the optical channels to pass through. This means that the multi-aperture imaging device may comprise a first operation state and a second operation state. The beam-deflecting means may deflect the optical path of the optical channels in the second operation state and in a first rotational position such that the same extends through a first transparent region of the cover 37a. In the second rotational position of the second operation state, the optical path of the optical channels may be deflected such that the same extends through a second transparent region of the cover 37b. A first diaphragm 33a may be configured to at least partially optically close in an optical manner the first transparent region in the second operation state. A second diaphragm 33b may be configured to at least partially close in a temporary optical manner the second transparent region in the first operation state. With this, an entry of stray light from a direction that is not the actual viewing direction of the multi-aperture imaging device may be reduced, which is advantageous with respect to the image quality. The first and/or second diaphragm 33a-b may be operable for at least one, for at least two, or for all of the optical channels. For example, at least one, at least two, or all optical channels of the multi-aperture imaging device may extend through the first diaphragm if the optical path of the optical channels is guided through the first transparent region, and may extend through the second diaphragm if the optical path of the optical channels is guided through the second transparent region.

It is to be understood that it is possible to combine a mechanism for unfolding the beam-deflecting means with a mechanism for translationally moving, i.e., mixed forms may exist. Unfolding the housing and/or extending the beam-deflecting means may be carried out such that, if applicable, the capturing module, i.e., the optical channels, optics thereof and/or the image sensor are moved out of the housing volume. A change of angle of the beam-deflecting means may make it possible that an expansion of the multi-aperture imaging device in the thickness direction is large and/or that the beam-deflecting means may deflect the optical path in an unhindered manner towards the "front" and the "back". Covering glasses such as the covers 37 may also be fixed with respect to the unfolded, or extended, elements. The covering glasses may comprise any planar or non-planar surface areas.

In other words, the multi-aperture imaging device may at least be partially attached on a movement carriage/travel carriage and may extend out of a flat housing such as a smartphone. In this case, beam-deflecting means and the unit consisting of the image sensor and the array optic may take other positions than in the case of images being captured in both viewing directions. The positioning may be carried out in such a way that a minimal installation height results and the tips of the both-way mirrored facets of the beam-deflecting means or a thin edge of the beam-deflecting unit is directed towards the array optic in this position.

Figure 3E:
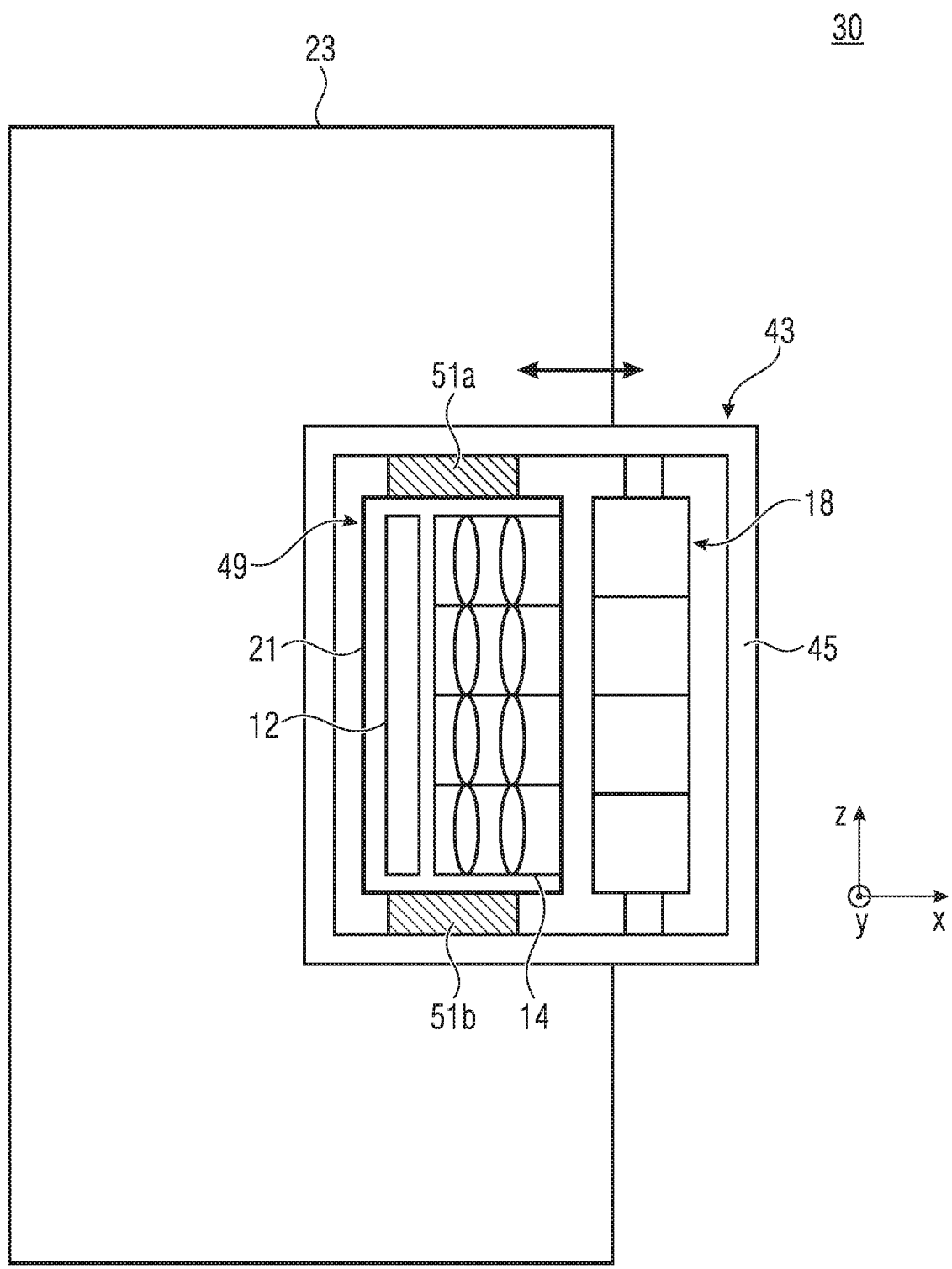
FIG. 3e-f show schematic top views of implementations of the multi-aperture imaging device according to FIGS. 3a-d according to embodiments.

FIG. 3e shows a schematic top view of the multi-aperture imaging device 30, wherein a function of an exemplary travel carriage 43, which may be movably arranged in the housing 23. The travel carriage 43 may comprise a frame or another fixing structure 45 with which the beam-deflecting means 18, the image sensor 12 and the array 14 are directly or indirectly, i.e., movably thereto, arranged or supported. For example, the beam-deflecting means 18 comprises a channel-individual faceting, i.e., one beam-deflecting region per channel, wherein the facets may be inclined with respect to each other to obtain a channel-individual deflection of the optical path. The beam-deflecting means 18 may be rotationally supported with respect to the frame 45 and may be moved based on a movement of the frame 45 and also based on the rotational movement 38 with respect to the frame 45. Some of the components, e.g., the image sensor 12 and the array 14, may be mechanically coupled to each other by means of a travel unit 49 so that a movement of the travel unit 49 causes a movement of the components coupled thereto. Within the travel carriage 43, e.g., the travel unit 49 may be configured to carry out the adjustment movement and, in this connection, execute a relative movement with respect to the frame 45. Alternatively or additionally, optional drives or actuators 51a and/or 51b, e.g., of the focusing means or of the optical image stabilizer, may simultaneously be moved. Corresponding drives 51a and/or 51b, e.g., pneumatic, hydraulic, thermal, piezoelectric, electrostatic, electrodynamic, magnetostrictive or electrostrictive actuators, may be arranged within the housing 21 and/or within the travel unit 49 or, as illustrated, outside of the housing 21. In this way, the focus and/or the image stabilization may be provided or set by the actuators 51a and/or 51b, while the travel unit 49, which is moved due to this, is moved additionally to obtaining the adjustment movement.

Figure 3F:
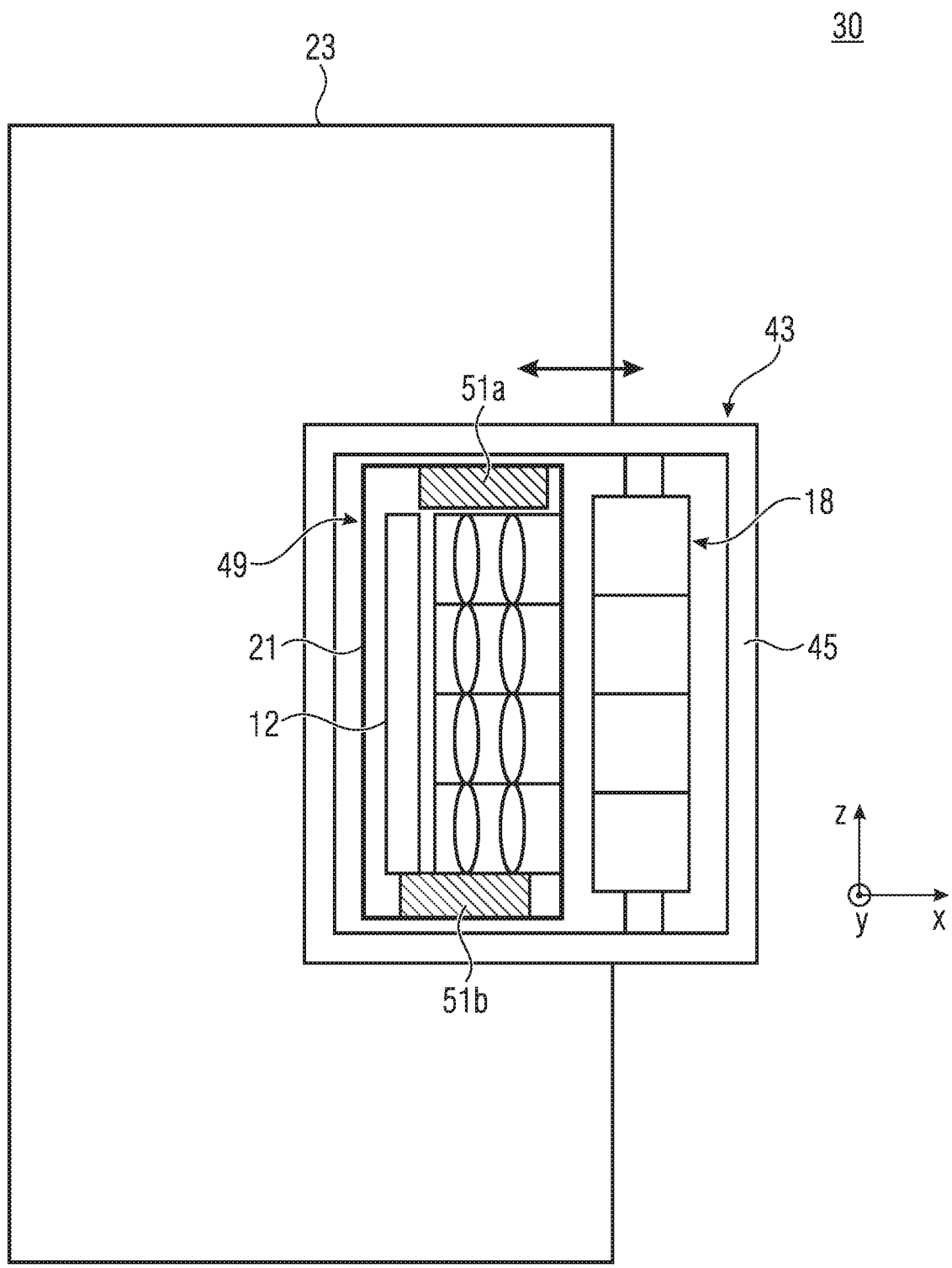

FIG. 3f shows a schematic top view of the multi-aperture imaging device 30, wherein the travel carriage 43, or the travel unit 49, is modified. Specifically, e.g., the actuators 51a and 51b are part of the travel unit 49 and, e.g., are arranged in the housing 21, so that the actuators 51a and/or 51b are moved along during executing the adjustment movement. The travel unit 49 may include the array 14, the image sensor 12, and the actuators 51a/51b for autofocusing and optical image stabilization. This means that the array 14, the image sensor 12 and the actuators 51a/51b for providing a focusing for the optical image stabilization are mechanically coupled to each other and are configured to mutually execute the adjustment movement 11.

The travel carriage 43 may be used to extend in a sideways manner the entire multi-aperture camera out of the housing 23. For example, the image sensor 12, the array 14, the beam-deflecting unit 18, actuators for autofocus and optical image stabilization, and, if applicable, covering glasses are arranged at this travel carriage, moving along in the x-direction. For the adjustment movement 11, the unit consisting of the image sensor, the array and, if applicable, the autofocus and/or the optical image stabilization may be additionally moved in a separate manner and along y, e.g., by means of the travel unit 49.

Figure 4:
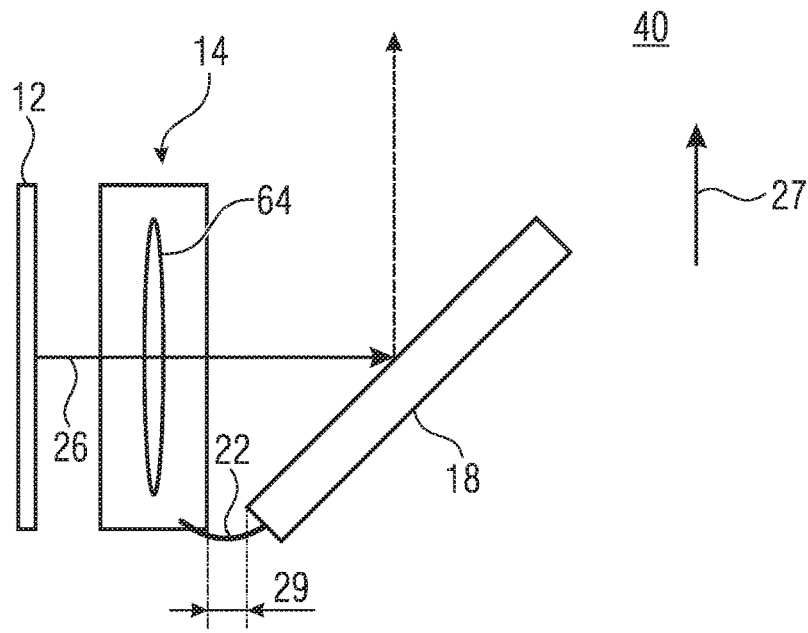
FIG. 4 shows a schematic side sectional view of a multi-aperture imaging device according to an embodiment, wherein an array of optical channels is formed in a single-line manner.

FIG. 4 shows a schematic side sectional view of a multi-aperture imaging device 40 according to an embodiment, wherein the array 14 is formed in a single-line manner, which means, contrary to the double-line array of FIG. 1, solely one line of optics 64 may be arranged. Regardless of this, the multi-aperture imaging device 40 may comprise a diaphragm structure 22.

A slit 29, i.e., a distance, is arranged between the array 14 and the beam-deflecting means 18. In this case, the multi-aperture imaging device 10 is implemented such that the diaphragm structure 22 at least partially closes the slit 29. In this connection, the diaphragm structure 22 may overlap the array 14, or a carrier 47, and/or the beam-deflecting means

18, as is illustrated. This means that the diaphragm structure 22 may be in mechanical contact with the array 14 and/or the beam-deflecting means 18 and may be arranged outside of a region or volume which is spatially arranged between the beam-deflecting means 18 and the array 14. As an alternative to the mechanical contact with the array 14, the diaphragm structure 22 may be in mechanical contact with a transparent structure, e.g., a transparent structure 42 as described in connection with FIG. 7. Alternatively, the diaphragm structure 22 may be arranged at the array 14 and/or the beam-deflecting means 18 such that the diaphragm structure is spatially located between the array 14 and the beam-deflecting means 18. In both cases, the slit 29 between the array 14 and the beam-deflecting means 18 is at least partially, i.e., at least 50%, at least 70%, at least 90%, or entirely closed.

The diaphragm structure 22 may be configured to prevent or at least partially an entry of light, in particular from a direction that differs from the directions assigned to the partial fields of view of the currently set viewing direction. By arranging the diaphragm structure 22 at an end of the carrier 47 and/or the beam-deflecting means 18 that is located or arranged opposite the viewing direction 27, an entry of stray light from the direction opposite to the viewing direction 27 may at least partially be reduced. If the slit 29 is completely closed and if the diaphragm structure 22 is configured to be completely opaque, an amount of the stray light, e.g., from the direction opposite to the viewing direction or also from further directions, may also be entirely reducible. With an increasing amount of reduction of the stray light, an increase in image quality may be obtained to an increasing extent.

The diaphragm structure 22 may be mechanically connected in a fixed manner to at least one of the arrays 14 and/or the beam-deflecting means 18 and be supported by this element in such a way. At the other element, a loose or fixed mechanical contact may be obtained in order to close the slit 29.

Figure 5:
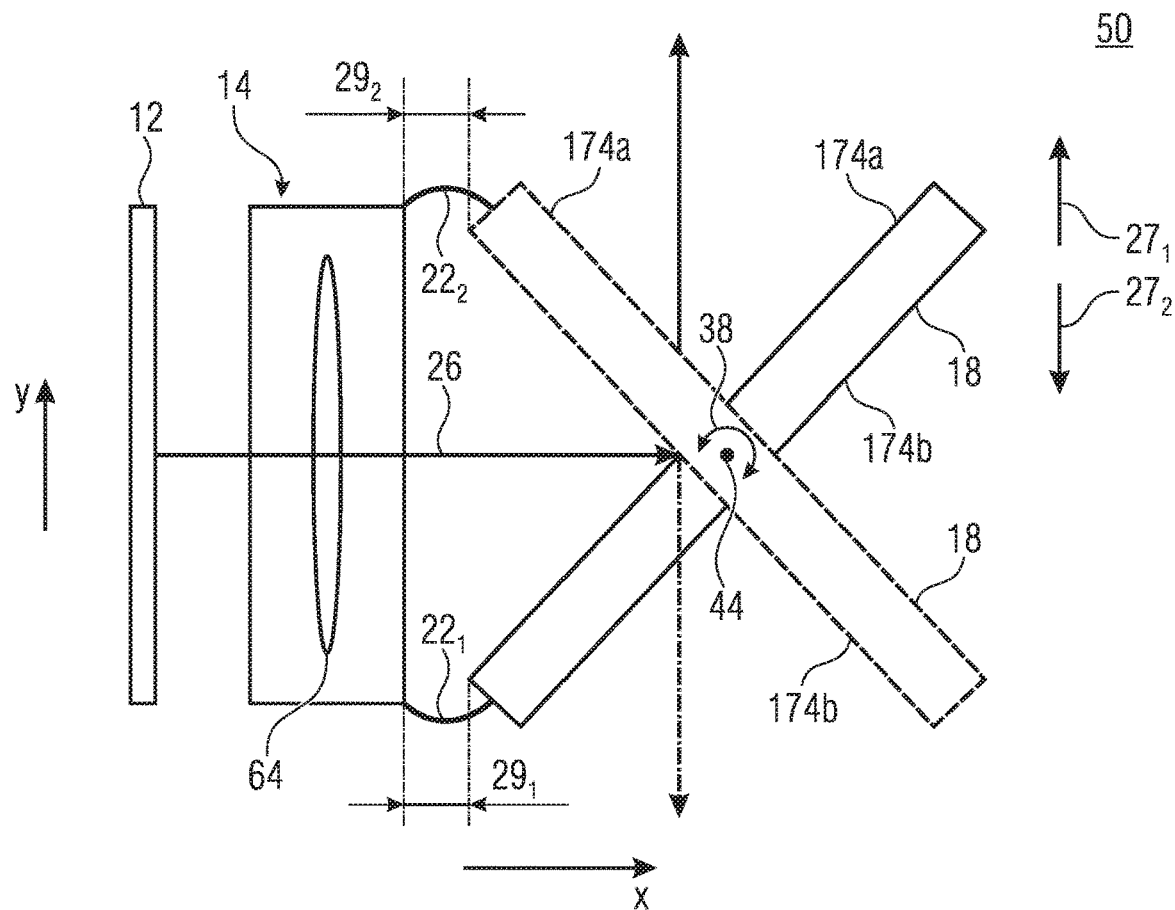
FIG. 5 shows a schematic side sectional view of a multi-aperture imaging device according to an embodiment, wherein the beam-deflecting means is configured to execute a rotational movement about a rotation axis.

FIG. 5 shows a schematic side sectional view of a multi-aperture imaging device 50 according to a further embodiment, wherein the beam-deflecting means 18 is configured to execute the rotational movement 38 about the rotation axis 44, wherein a first position and a second position of the beam-deflecting means 18 may be obtained based on the rotational movement 38. The beam-deflecting means 18 is configured to guide, in the first position, the optical paths 26 into a first viewing direction $27_1$. The beam-deflecting means 18 is further configured to deflect, in a second position, which is illustrated by dotted lines, the optical paths 26 into a second viewing direction $27_2$. For example, the beam-deflecting means 18 may comprise two opposing main sides 174a and 174b that are formed to be reflecting, wherein different reflecting main sides 174a or 174b are facing the optics 64 in the different positions. This means that the beam-deflecting means 18 deflects the optical paths 26 with different main sides in the different positions.

Based on positions between which may be switched by means of the rotational movement 38, a first slit $29_1$ may at least be partially closed in a first position by means of a diaphragm structure $22_1$, as is described in connection with the multi-aperture imaging device 40, for example Based on the rotational movement 38, the slit $29_1$ may vary in its dimension in a direction x extending in parallel to a direction starting from the image sensor 12 to the beam-deflecting means 18 and in parallel to a line-extension direction of the array 14. In the second position, the slit $29_2$ may be closed by means of the diaphragm structure $22_2$ in order to prevent an entry of stray light from the unused viewing direction $27_1$.

According to some requirements of multi-aperture imaging devices, a low or even minimal height of the multi-aperture imaging device along a direction perpendicular to the x-direction and perpendicular to the line-extension direction may be desired, e.g., along a y-direction, which may also be referred to as thickness direction. Due to the diagonal arrangement of the beam-deflecting means 18 with respect to the image sensor 12 and/or the array 14, a surface dimension of the beam-deflecting means 18 may be comparably larger than a surface of the image sensor 12 in order to make it possible to completely image and/or deflect the optical path 26. This means that, if the beam-deflecting means 18 was inclined such that the main sides 174a and/or 174b were arranged in parallel to the y-direction, the beam-deflecting means 18 would exceed the array 14 and/or the image sensor 12, counteracting the aim for a minimal installation height.

In order to switch between the two illustrated positions, it is also possible to execute the control of the beam-deflecting means 18 such that, in a direction between the first and the second positions, the main sides 174a and/or 174b extend in parallel to the x-direction. In this case, auxiliary sites of the beam-deflecting means 18 could approximate and/or distance themselves from the array 14 during the movement so that the slit $29_1$ and/or $29_2$ is variable in its dimension. However, a finite distance between the beam-deflecting means 18 and the array 14 is simultaneously needed in order to enable the corresponding movement. This distance leads to the slits $29_1$ and/or $29_2$, which may be closed by the described diaphragm structures $22_1$ and/or $22_2$ in order to at least partially prevent an entry of stray light through the corresponding slit.

In other words, it may be needed to set a distance between a front edge of the mirror (beam-deflecting means) and subsequent array of imaging optics so that the deflecting mirror may rotate. This slit is transparent and therefore light-transmissive By this, light may disadvantageously penetrate the structure from a direction that does not correspond to the intended viewing direction of the camera, therefore deteriorating the imaging quality. This effect may be counteracted with the diaphragm structures $22_1$ and/or $22_2$.

A diaphragm made of opaque and/or flexible material which extends across the entire expansion of the beam-deflecting means and, thus, across the entire width of the array objective may be arranged at the side/edge of the beam-deflecting means of the multi-aperture imaging device. For example, the same may be similar to a sealing lip.

Based on the implementation of the adjustment movement, the diaphragm structure may be moved along during the translational adjustment movement $11_1$ and/or may compensate the rotational adjustment movement $11_2$ based on an overhang and/or a flexible implementation of the beam diaphragm structure 22.

Before further details with respect to herein-described multi-aperture imaging devices are subsequently explained, an embodiment of the beam-deflecting means 18 is to be described. Although the same may also be formed as a planar mirror or as a double-sided mirror, a space-saving realization may be obtained based on a wedge-shape. Furthermore, several wedges may be arranged in the beam-deflecting means 18 and may each form a facet of the same, wherein each optical channel of the multi-aperture imaging device is assigned to a facet. Through different inclinations of the facets with respect to a reference position of the beam-deflecting means, the optical paths may be deflected in different directions, enabling a divergence of the direction deflection, i.e., a different direction deflection or a difference between two direction deflections so that different partial regions of the total object region may be captured.

Advantageous implementations of the beam-deflecting means 18 are described based on FIGS. 6a-f. The discussions show a number of advantages that may be executed individually or in any combination, however, which are not intended to be limiting. The illustrated diaphragm structure 22 is optional so that embodiments may also be implemented without the same.

Figure 6A:
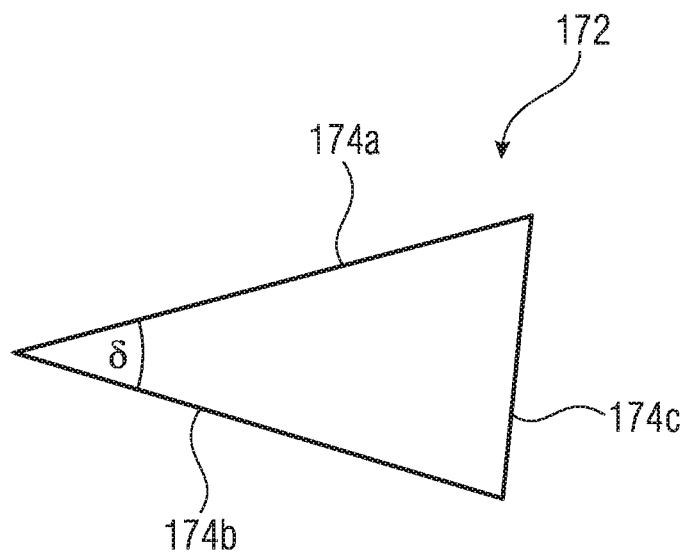
FIGS. 6a-f show advantageous implementations of a beam-deflecting means according to embodiments.

FIG. 6a shows a schematic side sectional view of a beam-deflecting element 172 that may be used as one of the beam-deflecting regions 46 in beam-deflecting means described herein. The beam-deflecting element 172 may be operable for one, a plurality of or all of the optical channels 16a-d and may comprise a traverse-type cross section. Although a triangular cross section is shown, any other polygon is also possible. Alternatively or additionally, the cross section may also comprise at least one curved surface, wherein, particularly with respect to reflecting surfaces, an implementation which is planar at least in regions may be advantageous in order to prevent imaging aberrations. The two main sides 174a and 174b may be inclined towards each other by an angle σ. The angle σ may comprise a value between 1° and 89°, advantageously comprises a value between 5° and 60°, and particularly advantageously comprises a value between 10° and 30°. The main sides 174a and 174b are inclined towards each other at an angle of at most 60°.

For example, the beam-deflecting element 172 comprises a first side 174a, a second side 174b and a third side 174c. At least two sides, e.g., the sides 174a and 174b, are configured to be reflective so that the beam-deflecting element 172 is configured to be reflective on both sides. The sides 174a and 174b may be main sides of the beam-deflecting element 172, i.e., sides having a surface that is larger than that of the side 174c.

In other words, the beam-deflecting element 172 may be formed to be wedge-shaped and to be reflective on both sides. Opposite to the surface 174c, i.e., between the surfaces 174a and 174b, a further surface may be arranged, which is substantially smaller than the surface 174c, however. In other words, the wedge formed by the surfaces 174a, 174b and 174c does not arbitrarily taper, but is provided at its pointed side with a surface and is therefore blunted.

Figure 6B:
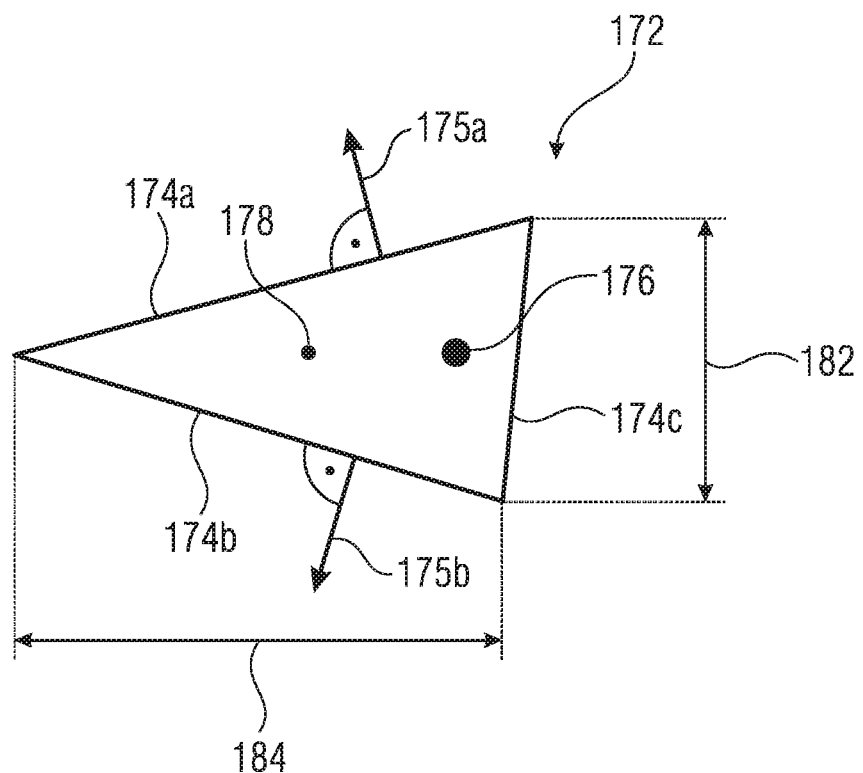

FIG. 6b shows a schematic side sectional view of the beam-deflecting element 172, wherein a suspension or a displacement axis 176 of the beam-deflecting element 172 is described. For example, the displacement axis 176 may be the rotation axis 44. The displacement axis 176 about which the beam-deflecting element 172 may be rotationally or translationally movable in the beam-deflecting means 18 may be displaced eccentrically with respect to a centroid 178 of the cross section. The centroid may alternatively also be a point that describes half of the dimension of the beam-deflecting element 172 along a thickness direction 182 and along a direction 184 perpendicular thereto.

The main side 174a may comprise a surface normal 175a, whereas the main side 174b may comprise a surface normal 175b. If a rotational movement about the displacement axis 176 is used to switch between the first position and the second position of the beam-deflecting means, the rotational movement of the beam-deflecting means may be executed such that it avoids an orientation between the two positions in which one of the main sides 174a or 174b is entirely facing the array 14, as is described in combination with FIG. 5. This may also be understood such that, when switching between the first and the second operation state or position by means of the rotational movement, the surface normal 175a and the surface normal 175b of the second main side comprise at each point in time an angle of at least 10° as to a direction towards the image sensor and, if applicable, in parallel to a surface normal of the image sensor. In this way, it may be avoided that one of the angles is 0° or 180°, which could indicate a large or approximately maximum expansion of the beam-deflecting means along the thickness direction.

For example, the displacement axis 176 may be unchanged along a thickness direction 182 and may comprise any offset in a direction perpendicular thereto. Alternatively, an offset along the thickness direction 182 is also conceivable. For example, the displacement may be carried out such that, upon a rotation of the beam-deflecting element 172 about the displacement axis 176, a larger actuator travel is obtained as when rotating about the centroid 178. Thus, by means of to the displacement of the displacement axis 176, the distance about which the edge between the sides 174a and 174b is moved upon a rotation may increase at the same rotation angle in comparison to a rotation around the centroid 178. The beam-deflecting element 172 is arranged such that the edge, i.e., the pointed side of the wedge-shaped cross section, between the sides 174a and 174b faces the image sensor. By means of small rotational movements, a respectively other side 174a or 174b may deflect the optical path of the optical channels. It is evident that the rotation may be executed such that a space requirement of the beam-deflecting means along the thickness direction 182 is low, since a movement of the beam-deflecting element 172 in such a way that a main side is perpendicular to the image sensor is not needed.

The side 174c may also be referred to as auxiliary side or as back side. Several beam-deflecting elements may be connected with each other such that a connecting element is arranged at the side 174c or extends through the cross section of the beam-deflecting elements, i.e., it is arranged on the beam-deflecting elements, e.g., in the region of the displacement axis 176. In particular, the holding element may be arranged such that it does not project beyond the beam-deflecting element 172 along the direction 182 or only to a small extent, i.e., at most 50°, at the most 30°, or at most 10°, so that the holding element does not increase or determine an expansion of the total structure along the direction 182.

Alternatively, the expansion in the thickness direction 182 may be determined by the lenses of the optical channels, i.e., they comprise the dimension defining the minimal thickness.

The beam-deflecting element 172 may be formed of glass, ceramics, glass ceramics, plastics, metal, or any combination of these materials and/or further materials.

In other words, the beam-deflecting element 172 may be arranged such that the tip, i.e., the edge between the main sides 174a and 174b, is directed towards the image sensor. Holding the beam-deflecting elements may be carried out such that it solely occurs at the back side or in the interior of the beam-deflecting elements. i.e., the main sides are not covered. A mutually holding or connecting element may extend across the back side 174c. The rotation axis of the beam-deflecting element 172 may be eccentrically arranged.

Figure 6C:
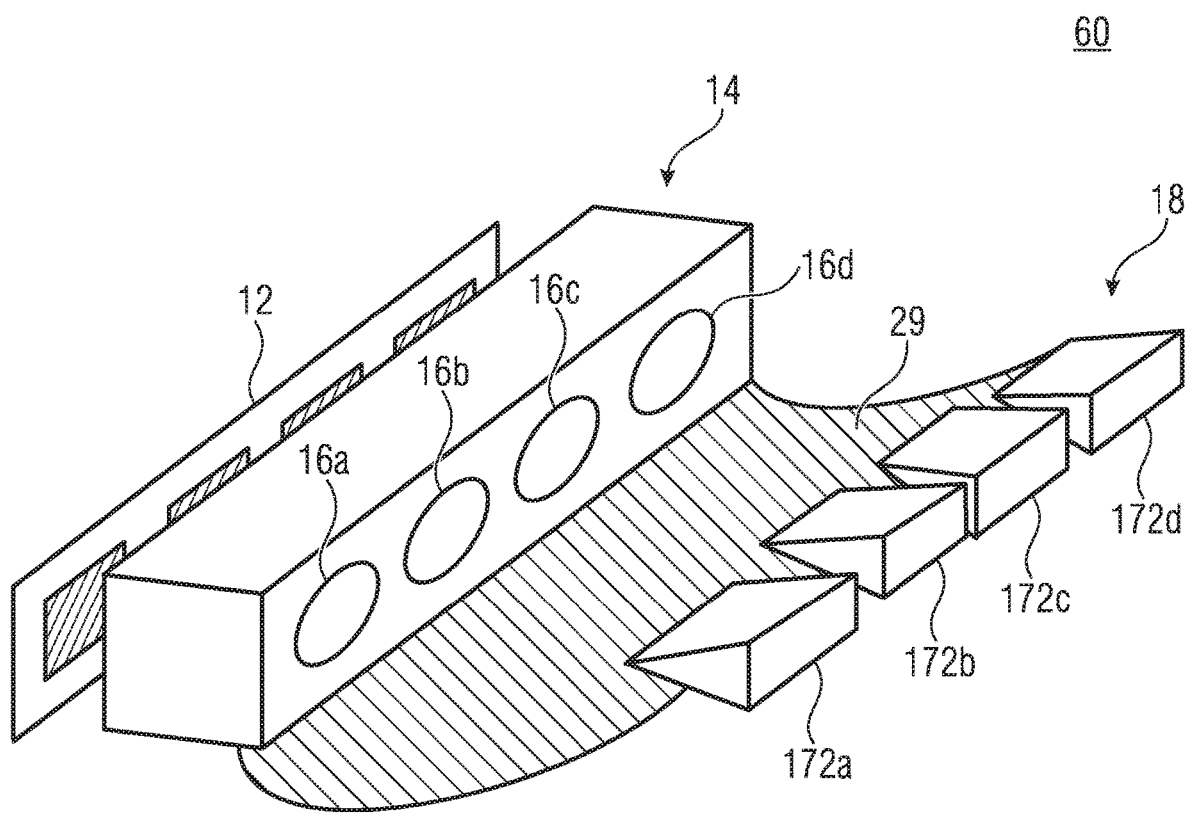
Figure 6C:
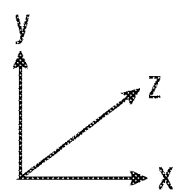

FIG. 6c shows a schematic perspective view of a multi-aperture imaging device 60 including an image sensor 12 and a single-line array 14 of optical channels 16a-d arranged side-by-side. The beam-deflecting means 18 includes a number of beam-deflecting elements 172a-d which may correspond to the number of optical channels. Alternatively, a smaller number of beam-deflecting elements may be arranged, e.g., if at least one beam-deflecting element is used by two optical channels. Alternatively, a larger number may also be arranged, e.g., if switching the deflection direction of the beam-deflecting means 18 is executed by a translational movement. Each beam-deflecting element 172a-d may be assigned to an optical channel 16a-d. The beam-deflecting element 172a-d may be formed as a multitude of elements 172. Alternatively, at least two, several or all of the beam-deflecting elements 172a-d may be formed integrally with each other.

Figure 6D:
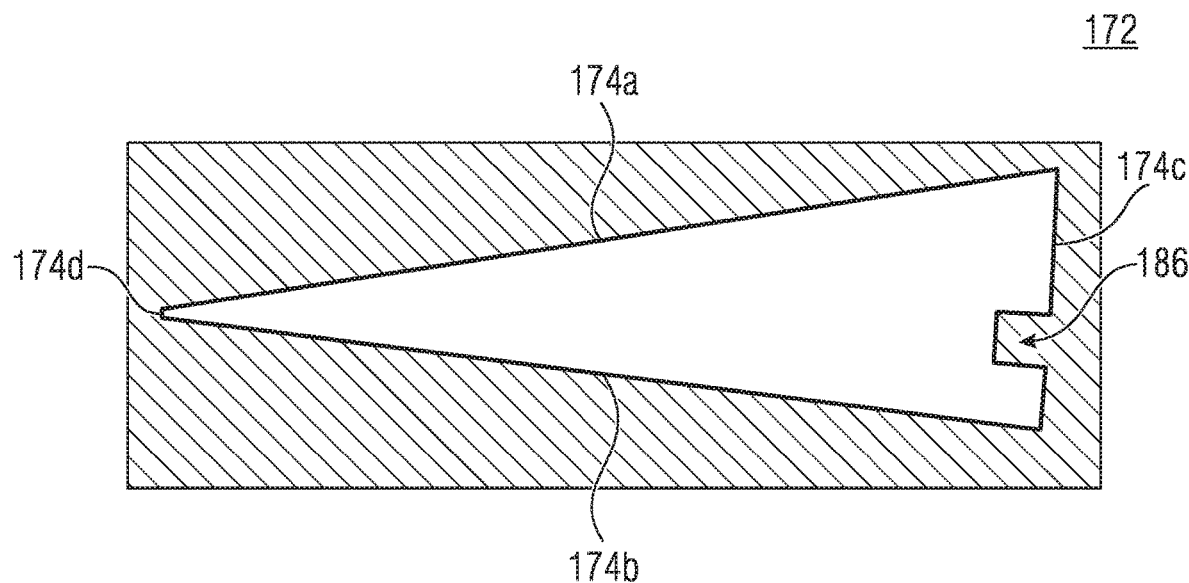

FIG. 6d shows a schematic side sectional view of the beam-deflecting element 172, whose cross section is formed as a free-form surface, which means that it does not necessarily correspond to a simple triangle or square. Thus, the side 174c may comprise a recess 186 that enables fixing a holding element, wherein the recess 186 may also be formed as a projecting element, e.g., as a groove of a tongue-groove system. The cross section further comprises a fourth side 174d having a smaller surface expansion than the main sides 174a and 174b and connecting the same to each other.

Figure 6E:
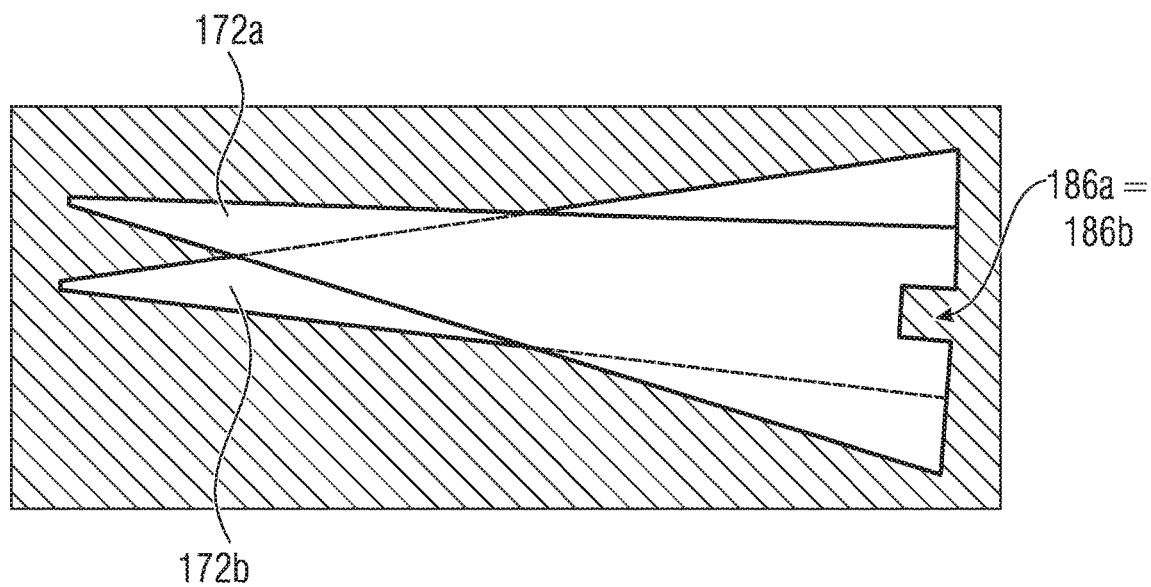

FIG. 6e shows a schematic side sectional view of a first beam-deflecting element 172a and a second beam-deflecting element 172b arranged behind the former in the illustration direction. In this case, the recesses 186a and 186b may be arranged such that they are substantially congruent so that an arrangement of a connecting element in the recesses is possible.

Figure 6F:
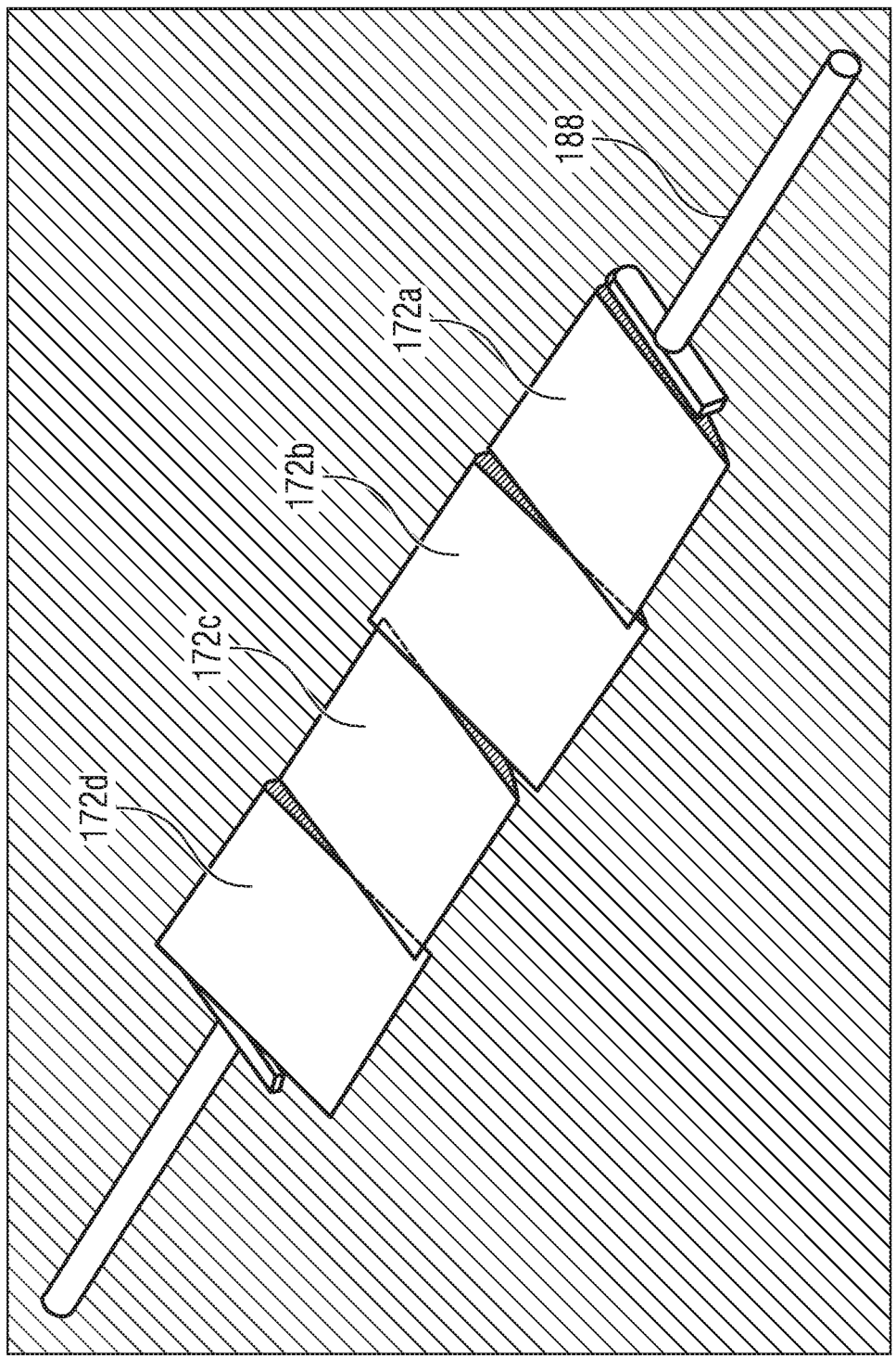

FIG. 6f shows a schematic perspective view of the beam-deflecting means 18, e.g., comprising four beam-deflecting elements 172a-d connected with a connecting element 188. The connecting element may be usable to be translationally and/or rotationally moved by an actuator manner. The connecting element 188 may be integrally configured and may extend across an extension direction, e.g., the y direction, at or in the beam-deflecting elements 172a-d. Alternatively, the connecting element 188 may also only be connected with at least one side of the beam-deflecting means 18, e.g., if the beam-deflecting elements 172a-d are integrally formed. Alternatively, a connection to an actuator and/or a connection of the beam-deflecting elements 172a-d may also be carried out in any other way, e.g., by means of gluing, bonding or soldering. The beam-deflecting elements 172a-d may be formed with a small distance or even directly in contact with each other so that there are no gaps or as few gaps as possible implemented between the beam-deflecting elements 172a-d.

This means that the beam-deflecting means 18 may be formed as an array of adjacently arranged facets, each optical channel being assigned to one of the facets. The diaphragm structure may extend across the array of facets.

The beam-deflecting means may comprise a first and a second reflecting main side 174a and 174b, wherein the main sides may be inclined towards each other with an angle δ of 60° or less.

Based on FIGS. 7a-7c, a multi-aperture imaging device 70 including the rotationally movable beam-deflecting means 18 including the wedge-shaped facets according to FIGS. 6a-4f is subsequently described. Optics 64 of the array 14 are exemplarily formed as multi-part lens combinations. The multi-aperture imaging device 70 includes the diaphragm structure 22 which may be mechanically fixed at a connection edge between the main sides 174a and 174b or at the auxiliary side 174d, for example. The optics 64 may be arranged in the housing 21. Optionally, the image sensor 12 may also be arranged in the housing 21. Although the subsequent discussions relate to a housing in which the optics 64 are arranged, the same discussions also apply without limitations to an array of optical channels, e.g., comprising a carrier, as is described for the carrier 47. The optics 64 may directly or indirectly be arranged via holding structures at the carrier 47, which is possibly formed in a transparent manner. For example, the housing 21 may comprise main sides $21_1$ and $21_2$, wherein the main side $21_1$ is characterized in that it is arranged to face the beam-deflecting means 18 and provides a side of the housing 21 adjacent to the beam-deflecting means 18. For example, when considering FIG. 1, the carrier 47 may also comprise a main side arranged to face the beam-deflecting means 18, and a main side arranged to face the image sensor 12. Auxiliary sides $21_3$ and $21_4$ may connect the two main sides $21_1$ and $21_2$ to each other. At least the main side $21_1$ of the housing 21 may also be understood to be a main side of the array.

Figure 7A:
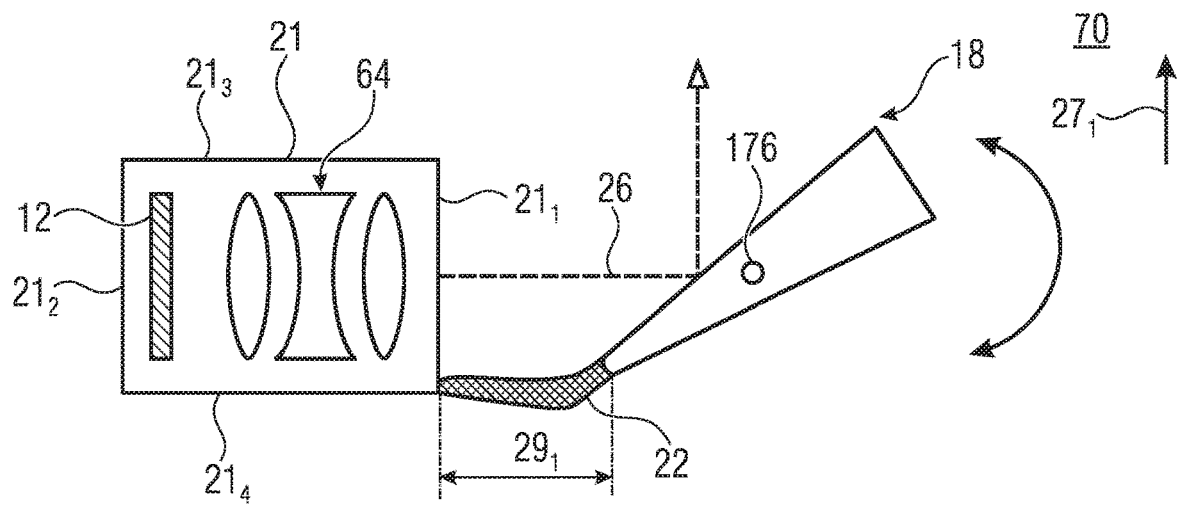
FIG. 7a shows a schematic view of a multi-aperture imaging device according to an embodiment in a first rotational position of the beam-deflecting means, wherein a diaphragm structure closes a slit.

FIG. 7a now illustrates the multi-aperture imaging device 70 with a first position of the beam-deflecting means 18, wherein the diaphragm structure 22 closes the slit $29_1$.

Figure 7B:
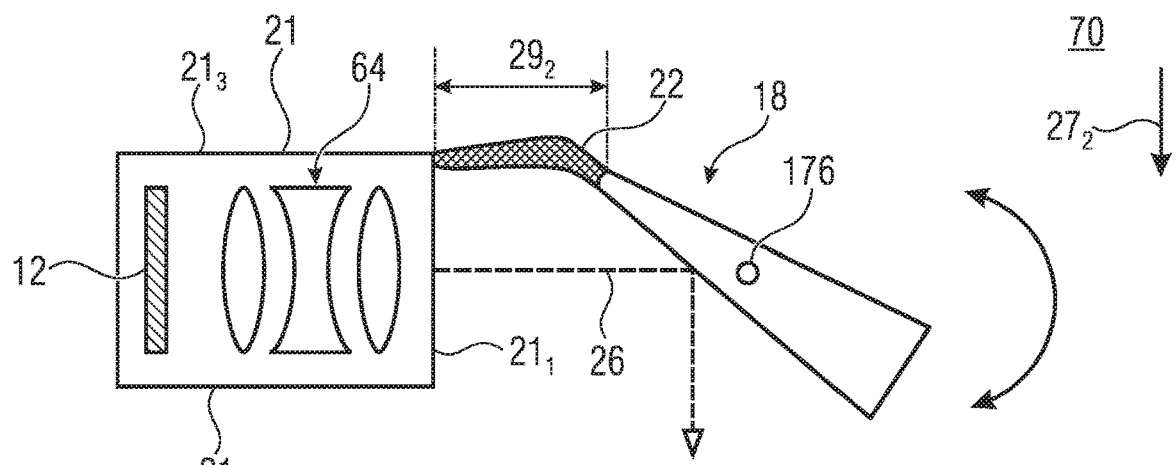
FIG. 7b shows a schematic view of the multi-aperture imaging device of FIG. 5a in the second position of the beam-deflecting means, wherein the diaphragm structure closes a slit at a different spot.

FIG. 7b illustrates the multi-aperture imaging device 70 in a second position of beam-deflecting means 18, wherein the diaphragm structure 22 closes the slit $29_2$. In the first position illustrated in FIG. 7a, the diaphragm structure may mechanically contact as far on the outer side as possible, which means adjacently to the auxiliary side $21_4$, which means the main side $21_1$ adjacent to the auxiliary side $21_4$ or, as is exemplarily illustrated in FIG. 1, the auxiliary side $21_4$. FIG. 7b illustrates a situation in which the diaphragm structure 22 mechanically contacts the housing 21, or the array, adjacently to the auxiliary side $21_3$.

Figure 7C:
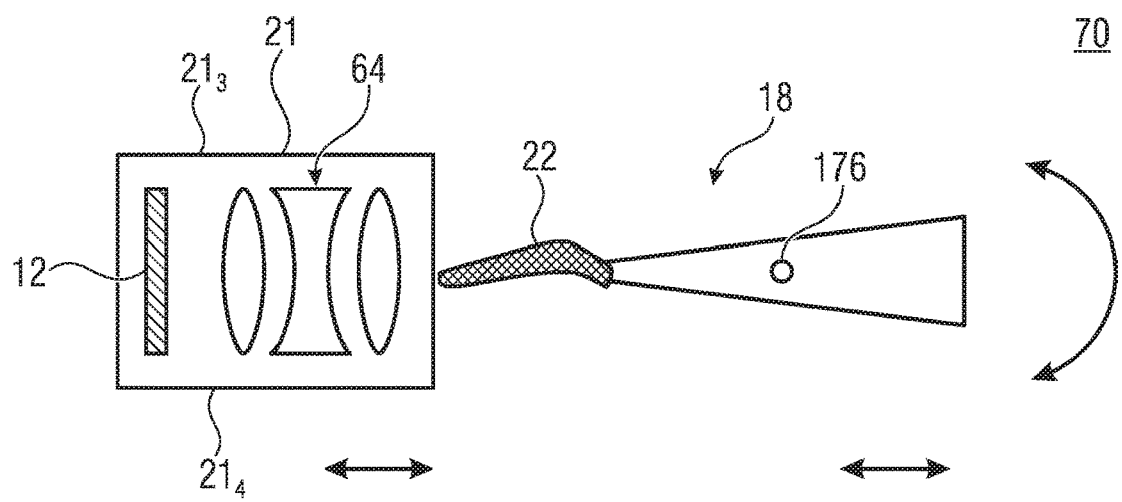
FIG. 7c shows a schematic view of the multi-aperture imaging device of FIG. 5a in an optional intermediate position between the first position and the second position.

FIG. 7c illustrates the multi-aperture imaging device 70 in an optional intermediate position between the first position and the second position. In this third position, the diaphragm structure 22 is directed towards a region between the auxiliary sides $21_3$ and $21_4$. Based on the illustration according to FIGS. 7a and 7b, the diaphragm structure 22 may be elastically or flexibly formed and may provide, e.g., a flexible diaphragm or sealing lip. For this, the diaphragm structure 22 may include elastic materials such as silicon, polyurethane or other elastomers. When switching between the first and second position, the diaphragm structure 22 may brush across the main side $21_1$. However, as is illustrated in FIG. 7c, based on a variable distance between the beam-deflecting means 18 and the array 14, or the housing 21, a situation in which the diaphragm structure 22 is free of contact to the array 14, or the housing 21, may be obtained. For this, the multi-aperture imaging device 70 may include an actuator, for example, which is configured to translationally move the beam-deflecting means 18 and/or the array 14 in order to temporarily increase a distance between the array and the beam-deflecting means 18. This means that the multi-aperture imaging device 70 may be configured to provide a translational movement between the array 14 and the diaphragm structure 22 during the rotational movement of the beam-deflecting means in order to temporarily increase a distance between the array and the diagram structure.

In other words, a diaphragm, which is made from a flexible material, extending across all facets of the mirror and therefore across the entire width of the array objective is arranged at a side/edge of the beam-deflecting means of the multi-aperture imaging device having a linear channel arrangement. The same is similar to a sealing lip. In the two states of use, i.e., the first and the second positions, the flexible diaphragm is arranged either above or below the array objective and closes the gap between the array objective and the beam-deflecting means such that stray light cannot not enter into the camera or only to a limited extent. In a third state, in which the camera is not used and in which the beam-deflecting means is parked in an intermediate position, the flexible diaphragm may neither be located above or below the array objective.

Figure 8:
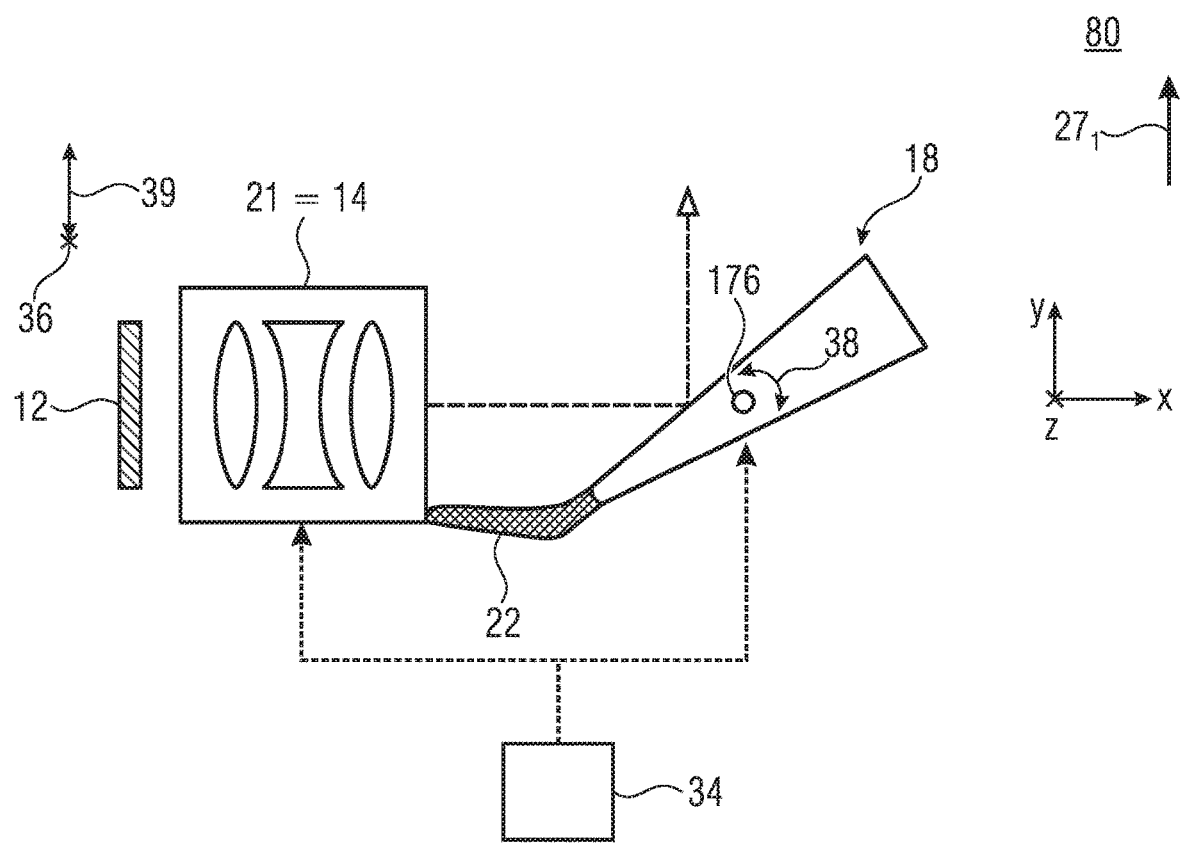
FIG. 8 shows a schematic side sectional view of a multi-aperture imaging device according to an embodiment, comprising an optical image stabilizer.

FIG. 8 shows a schematic side sectional view of a multi-aperture imaging device 80 according to an embodiment. In comparison to the multi-aperture imaging device 70, the multi-aperture imaging device 80 comprises an optical image stabilizer 34 configured to apply a force to the array 14, or the housing 21, and/or the beam-deflecting means 18. Due to the generated force, a relative movement between the image sensor 12, the array 14 and the beam-deflecting means 18 may be obtained, e.g., by a translational displacement of the array 14 along one or both of the image axes of an image provided by the image sensor 12. For example, provided for this may be a movement along a z-direction in parallel to the line-extension direction or along a y-direction which may be arranged in parallel to image axes 36 and/or 38 or may at least partially extend in this direction, which means that they comprise a corresponding direction component. Alternatively or additionally, a translational relative movement of the beam-deflecting means 18, e.g., along the y-direction, and/or a rotational movement around the axis 176 may be generated to obtain an optical image stabilization along the image direction 36 or 38, which is arranged in parallel to the y-direction, for example. This enables a low complexity since, in this case, the array 14 may only be moved along one direction, e.g., z, and an image stabilization may be obtained along two directions together with a movement of the beam-deflecting means, whose movement freedom in order to switch directions may already be provided. Alternatively or additionally to a movement of the array 14, a movement of the image sensor 12 may also be provided in order to completely or partially implement the optical image stabilization. Optical image stabilization may be advantageous if, in a capturing process during which partial fields of view or the total field of view are being captured, the multi-aperture imaging device 60 is moved with respect to the object region whose field of view is being captured. The rotational movement for the image stabilization may be overlapped with the rotational movement 38 and may be provided by the same actuator, for example.

The optical image stabilizer 34 may be configured to at least partially counteract this movement to reduce or prevent shaking of the image. For the optical image stabilization along a first image axis 36, e.g., which may be arranged in parallel to the line-extension direction z, the optical image stabilizer 34 may be configured to generate a first relative movement between the image sensor 12, the array 14 and the beam-deflecting means 18. For the optical image stabilization along a second image axis 39 arranged perpendicularly hereto, the optical image stabilizer 34 may be configured to generate a second relative movement between the image sensor 12, the array 14 and the beam-deflecting means 18. For the first relative movement, the optical image stabilizer 34 may be configured to translationally shift the array 14, or the image sensor 12, along the image axis 36. Alternatively or additionally, the optical image stabilizer 34 may be configured to generate a translational movement of the beam-deflecting means 18 along the image axis 36. In this case, the optical image stabilizer 34 is configured to execute the movements of the components such that the corresponding relative movement is created between the image sensor 12, the array 14 and the beam-deflecting means 18. The relative movement may be carried out in parallel to the line-extension direction z and perpendicularly to the optical paths. However, it may be advantageous to put the array 14 in a translational movement with respect to the image sensor 12 in order to mechanically stress an electronic circuitry of the image sensor 12 as little as possible or not at all with respect to further components, for example.

In order to generate the second relative movement, the optical image stabilizer 34 may be configured to generate a rotational movement of the beam-deflecting means 18 or to enable the same. The same may be overlapped with a movement for rotationally switching the beam-deflecting means 18. Individual actuators or a combined actuator means may be provided for both rotational movements. Alternatively or additionally, the optical image stabilizer may be configured to provide a translational relative movement between the image sensor 12 and the array 14 along the image axis 39 and/or a translational relative movement between the array 14 and the beam-deflecting means 18, wherein corresponding actuators may be arranged for this. In order to generate the rotational movement, e.g., in parallel to the rotational movement 38 or as a part thereof, the optical image stabilizer 34 may include, e.g., an actuator configured to generate the rotational movement 38. Although it is possible for obtaining the image stabilization to implement the optical image stabilizer 34 such that it controls the first and second relative movements as translational relative movements, an implementation of the second relative movement as rotational movement 38 may be advantageous since a translational movement of components along the second image axis 39 may be avoided in this case. This direction may be in parallel to a thickness direction of the multi-aperture imaging device 60, which according to some embodiments, is to be kept as low as possible. Such an object may be achieved by the rotational movement.

When considering FIG. 8 and the rotational movement 38 and/or a translational movement of the array 14 along the z-direction, which may be triggered by the optical image stabilizer 34, a restoring force may be obtained based on the elasticity of the diaphragm structure 22, or the rigidity of the diaphragm structure, as well as the mechanical contact between the diaphragm structure 22 and the array 14, or the beam-deflecting means 18, if the respective relative movement is generated by the optical image stabilizer 34, since a deformation of the diaphragm structure 22 occurs based on the relative movement. Alternatively or additionally, such a restoring force may at least be partially obtained by separate spring structures, e.g., elastic connection elements. The restoring force may be configured to restore at least 30%, at least 20%, or at least 10% of a maximum relative movement, i.e., a maximum deflection in connection with the relative movement by means of the optical image stabilizer 34 if the force of the optical image stabilizer 34 is retracted.

In other words, the flexible diaphragm 22 itself, or additional elements that are introduced or attached, may serve as spring elements for the beam-deflecting means and may therefore have a restoring effect when using the latter for optical image stabilization, for example.

Although the optical image stabilizer is described in combination with the flexible diaphragm, the optical image stabilizer may also be arranged in absence of the same, e.g., in the multi-aperture imaging device 10.

Figure 9:
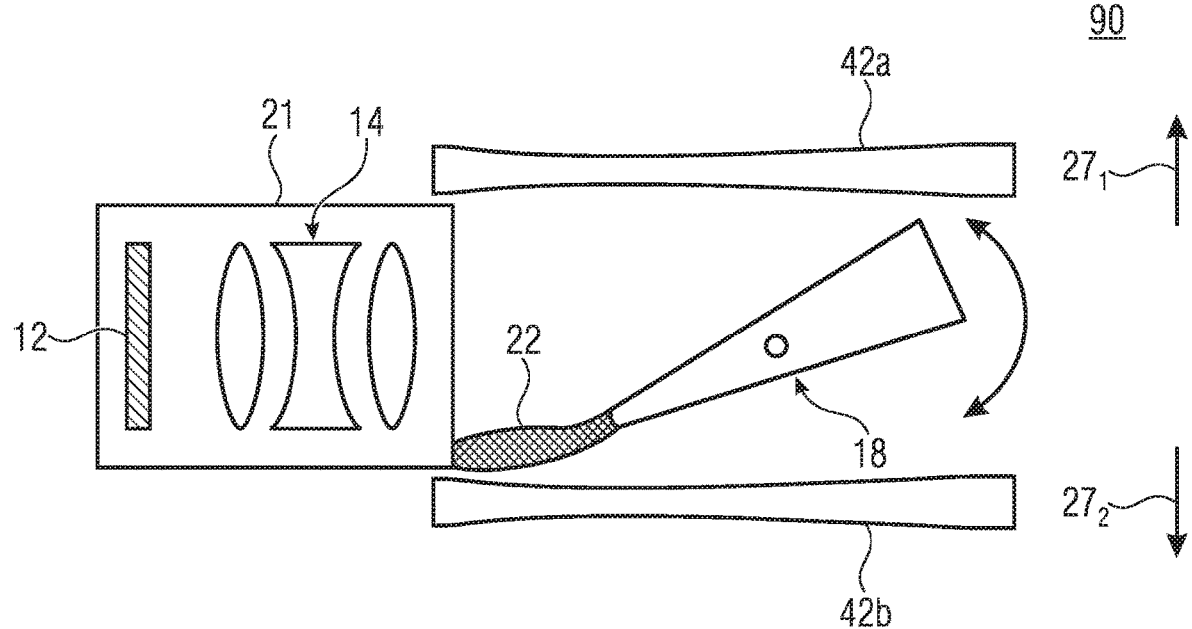
FIG. 9 shows a schematic perspective view of a multi-aperture imaging device according to an embodiment, comprising transparent structures that are arranged along the viewing directions of the multi-aperture imaging device starting from the beam-deflecting means.

FIG. 9 shows a schematic perspective view of a multi-aperture imaging device 90 according to an embodiment, comprising transparent structures 37a and 37b which are arranged along the viewing directions $27_1$ and $27_2$ starting from the beam-deflecting means 18. The transparent structures 37a and 37b may be configured to prevent an entry of dirt or particles in the direction of the housing 21, the beam-deflecting means 18 or further components. Alternatively or additionally, touching the beam-deflecting means 18. e.g., by means of a finger of a user or the like, may be prevented or made more difficult. For example, the multi-aperture imaging device 90 comprises two viewing directions and two transparent structures 37a and 37b, wherein each of the transparent structures 37a and 37b may be associated with one of the viewing directions $27_1$ and $27_2$, respectively. For example, when considering the multi-aperture imaging device 10, which may be formed to comprise only one viewing direction, the multi-aperture imaging device may also be implemented with only one transparent structure 37.

For example, the transparent structures 37a may include a glass material and/or polymer material and may be formed to be essentially transparent for the electromagnetic radiation to be captured by the multi-aperture imaging device 90, it also being conceivable that filters are introduced into the transparent structures. The transparent structures 37a and/or 37b may comprise a surface roughness that is low, which means that the transparent structures 37a and/or 37b may be implemented to be smooth.

An exemplary value of a roughness $R_a$ for the transparent structures 37a and/or 37b, however, which is not to be constructed as limiting, may be at most 0.03 μm, at most 0.005 μm, or at most 0.0005 μm, for example. The diaphragm structure 22 may comprise a roughness whose roughness value is comparably larger than the roughness of the transparent structures 37a and/or 37b. This makes it possible to make an adhesion of the diaphragm structure 22 at a transparent structure 37a and/or 37b be more difficult or to avoid the same upon a mechanical contact between the two. This means that, alternatively to the mechanical contact with the array 14, the diaphragm structure 22 may be in mechanical contact with the transparent structure 37a and/or 37b, e.g., in a temporally alternating manner. In the first position, and in the second position, the diaphragm structure may be in mechanical contact with the array 14 or one of the transparent structures 37a and 37b on the one hand, and with beam-deflecting means 18, on the other hand.

In other words, the flexible diaphragm 22 may comprise a rough surface so that the diaphragm may not adhere to smooth surfaces such as cover glasses 37a and/or 37b and/or may be released from the surface upon small forces applied by the beam-deflecting means. This means that, even in the presence of an adhesion, the diaphragm structure 22 may be easily released from the transparent structures 37a and/or 37b due to the rotational movement.

Figure 10:
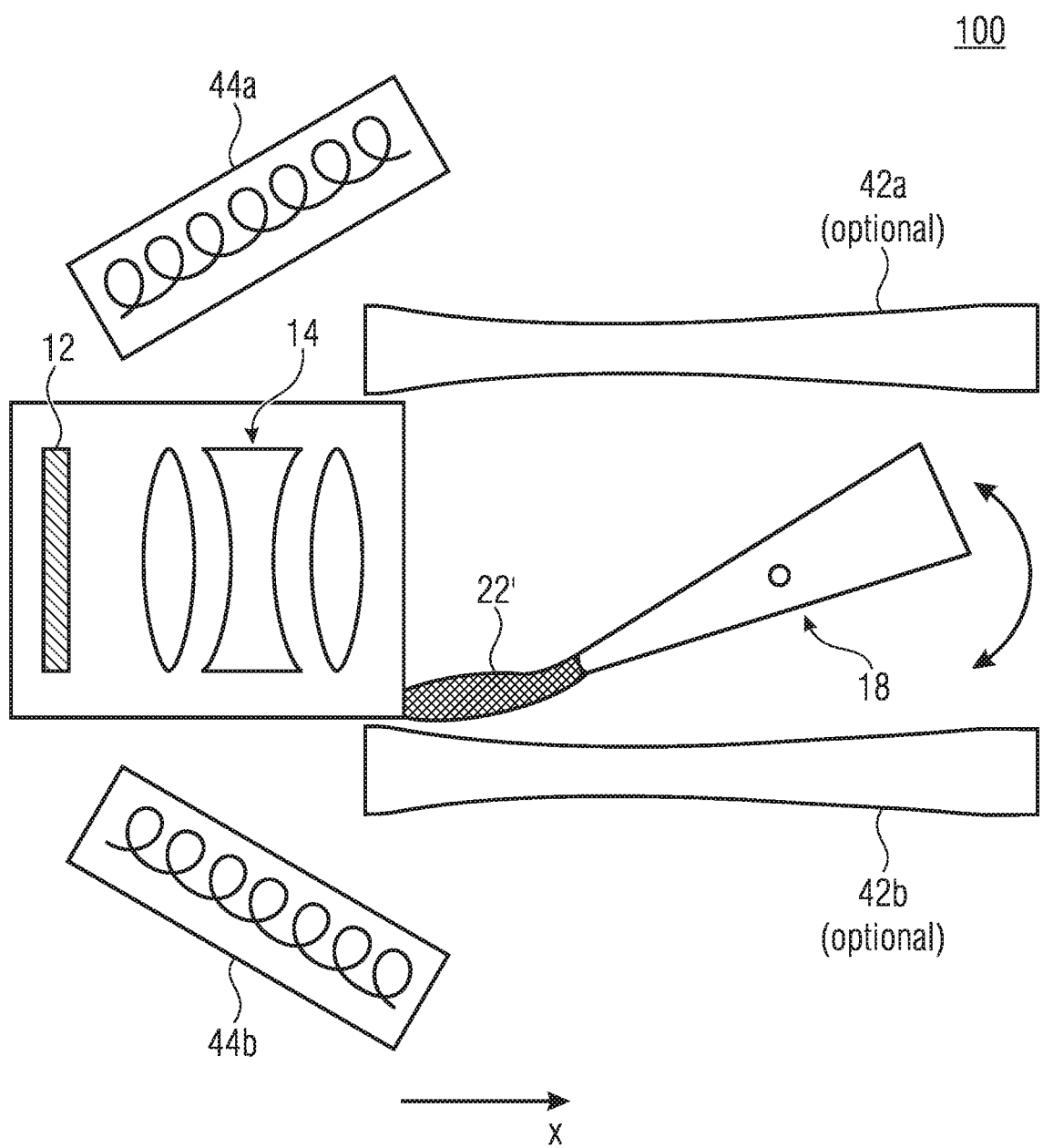
FIG. 10 shows a schematic side sectional view of a multi-aperture imaging device according to an embodiment, which may optionally include the transparent structures, but may easily also be implemented without the same.

FIG. 10 shows a schematic side sectional view of a multi-aperture imaging device 100 which may optionally include the transparent structures 37a and/or 37b; however, is easily implementable without the same. The multi-aperture imaging device 80 includes a diaphragm structure 22' that may be formed in a similar manner as the diaphragm structure 22; however, which may additionally include a magnetic or magnetizable material, e.g., ferromagnetic or paramagnetic materials. For example, these materials may be introduced as particles, chips, sawings, or grindings into the material of the diaphragm structure 22. This means that that diaphragm structure 22' may include magnetic materials. A magnetic field-providing element 44a and/or 44b, i.e., a magnetic field source, may be arranged adjacent to the housing 21 and/or the transparent structures 37a and/or 37b and therefore adjacent to the diaphragm structure 22. The magnetic field-providing elements 44a and/or 44b may be elements that provide, in a temporal alternation, a magnetic field that is y strong or weak or provide none at all. For example, the magnetic field sources 44a and 44b may be electromagnets. Alternatively or additionally, it is also conceivable that the magnetic field sources, e.g., include permanent magnets and be arranged with a variable distance to the diaphragm structure 22' in order to provide a comparably large magnetic field at a small distance and to provide a comparably small magnetic field at a large distance.

Magnetic fields of the magnetic field sources 44a and 44b may be configured such that an attracting force is applied to the diaphragm structure 22' based on the magnetic field so that the attracting force executes the rotational movement of the beam-deflecting means 18 or at least supports the same. Alternatively or additionally, it is also conceivable that, after the rotational movement of the beam-deflecting means 18, a part of the diaphragm structure 22' that possibly remains in the field of view of the array 14 is moved out this field of view, i.e., is pulled out by the attracting force.

In other words, electromagnets attracting the flexible diaphragm in addition to the rotational movement of the beam-deflecting means 18 may be formed above and below the array objective from a coil and, if applicable, an additional core so that the diaphragm has an even more improved light-sealing effect.

The above-described arrangement of a diaphragm structure enables an improvement of the stray light suppression in multi-aperture imaging devices. Such multi-aperture imaging devices and/or multi-aperture imaging systems may be used in concepts having a linear channel arrangement and a smallest installation size.

According to embodiments, a focusing means may be provided which is configured to change, in a channel-individual manner for two or several or possibly all optical channels, a focus of the multi-aperture imaging device 100 or of another of the herein described multi-aperture imaging devices, e.g., the multi-aperture imaging device 10, 10',40, 50, 60, 70, 80, or 90. For this, an actuator may be used to, e.g., change a distance between at least one optic of the array 14, or the entire array 14, and the image sensor 12. This may lead to a variable distance between the optic, or the array 14, and the beam-deflecting means 18, e.g., if the optic of the optical channel, i.e., the objective, is axially moved. By means of a flexible or elastic diaphragm, the slit between the array 14 and the beam-deflecting means 18 may remain closed, e.g., if an axial expansion of the diaphragm structure 22' along the x-direction is larger than or equal to a maximum distance between the array 14 and the beam-deflecting means 18. When decreasing the distance and/or subsequently increasing the same, a linear compression/elongation or deformation of the diaphragm structure 22' may keep the slit closed.

Although the means for optical image stabilization, or the optical image stabilizer, and the focusing means are described in connection with a flexible diaphragm, both means may be provided individually or in combination and also in absence of such a diaphragm. For example, the array 14 and the image sensor 12 may be moved as a mutual unit by an actuator of the optical stabilizer, e.g., by arranging and moving the unit in, at or on a movable travel carriage. Within this unit, one or several actuators may be provided to provide a movement between one, several, or all optics of the array and the beam-deflecting means 18 and/or the image sensor 12. Such a movement may occur by moving the optics and/or possible carriers connected to the optics.

In the adjustment movement, the means for optical image stabilization and/or the focusing means may be accordingly moved along. Alternatively or additionally, the same actuators or actuating means may also be used for generating a movement.

Figure 11:
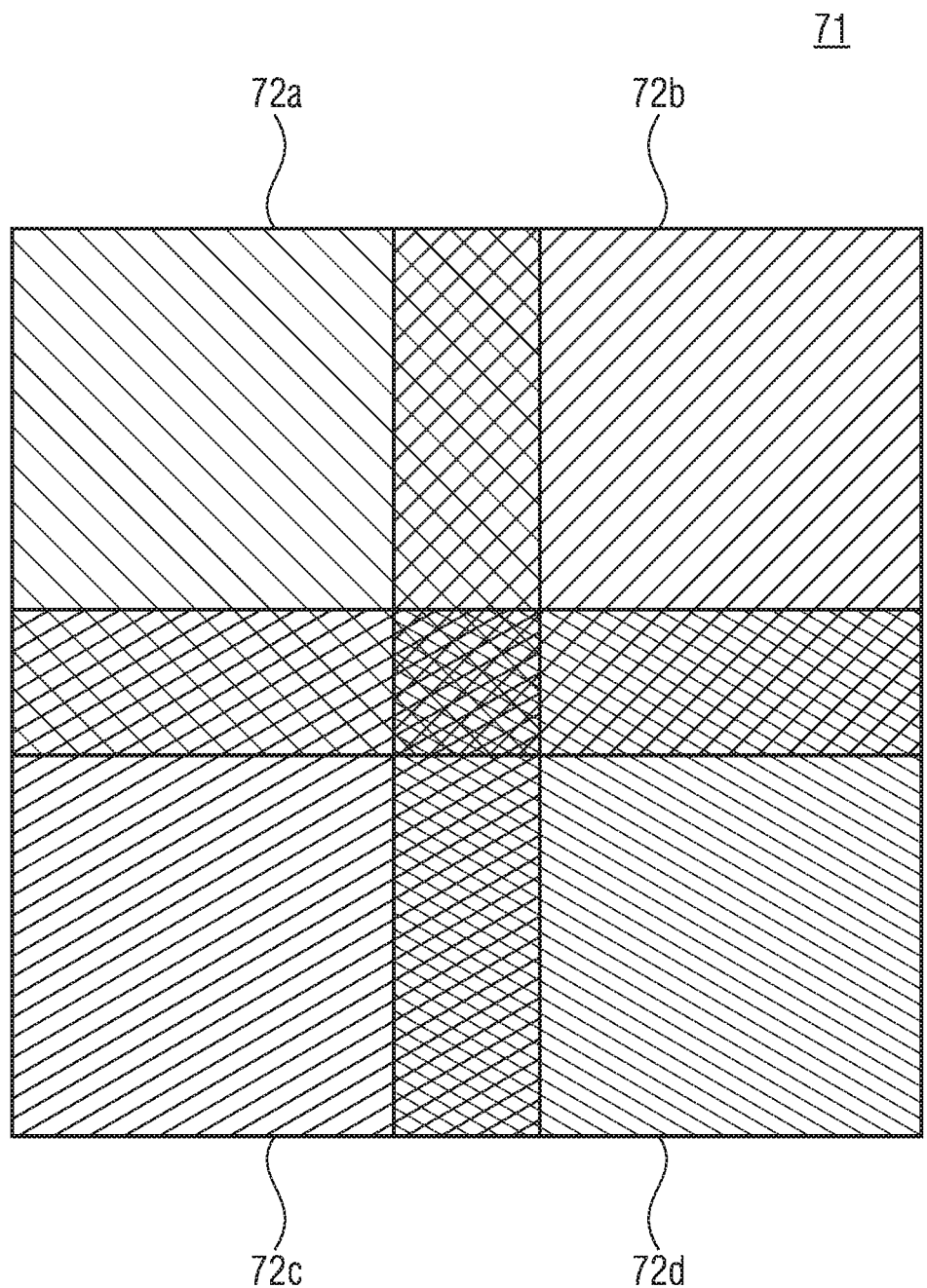
FIG. 11 shows a schematic illustration of a total field of view according to an embodiment, for example, as may be captured with an above-described multi-aperture imaging device.

FIG. 11 shows a schematic illustration of a total field of view 71, as may be detected, e.g. with an above-described multi-aperture imaging device, e.g., the multi-aperture imaging device 10, 10',40, 50, 60, 70, 80, 90, or 100. Although the above-described multi-aperture imaging devices are described such that they exemplarily comprise four optical channels for capturing four partial fields of view 72a-72d of the total field of view, it is to be noted that the herein-described multi-aperture imaging devices may also be formed with a different number of optical channels, e.g., with a number of at least 2, at least 3, at least 4, at least 10, at least 20, or any higher value. Furthermore, it is to be noted that it is conceivable that some of the partial fields of view 72a-72d may be captured with a number of more than one optical channel. The optical paths of the optical channels of the multi-aperture imaging devices may be guided to different partial fields of view 72a-d, wherein each optical channel may be assigned a partial field of view 72-d. For example, the partial fields of view 72a-d overlap with each other to enable joining individual partial fields of view to a total field of view. If the multi-aperture imaging device comprises a number of optical channels that differs from 4, the total field of view 71 may comprise a number of partial fields of view that differs from 4. Alternatively or additionally, at least one partial field of view 72a-d may be captured by a second optical channel or by any higher number of optical channels having any higher number of modules (multi-aperture imaging devices) to form stereo cameras, trio cameras, quattro cameras, or cameras of higher values. The individual modules may be shifted by fractions of a pixel and may be configured to implement methods of super-resolution. For example, a number of optical channels and/or a number of multi-aperture imaging devices and/or a number of partial fields of view is/are arbitrary.

Figure 12:
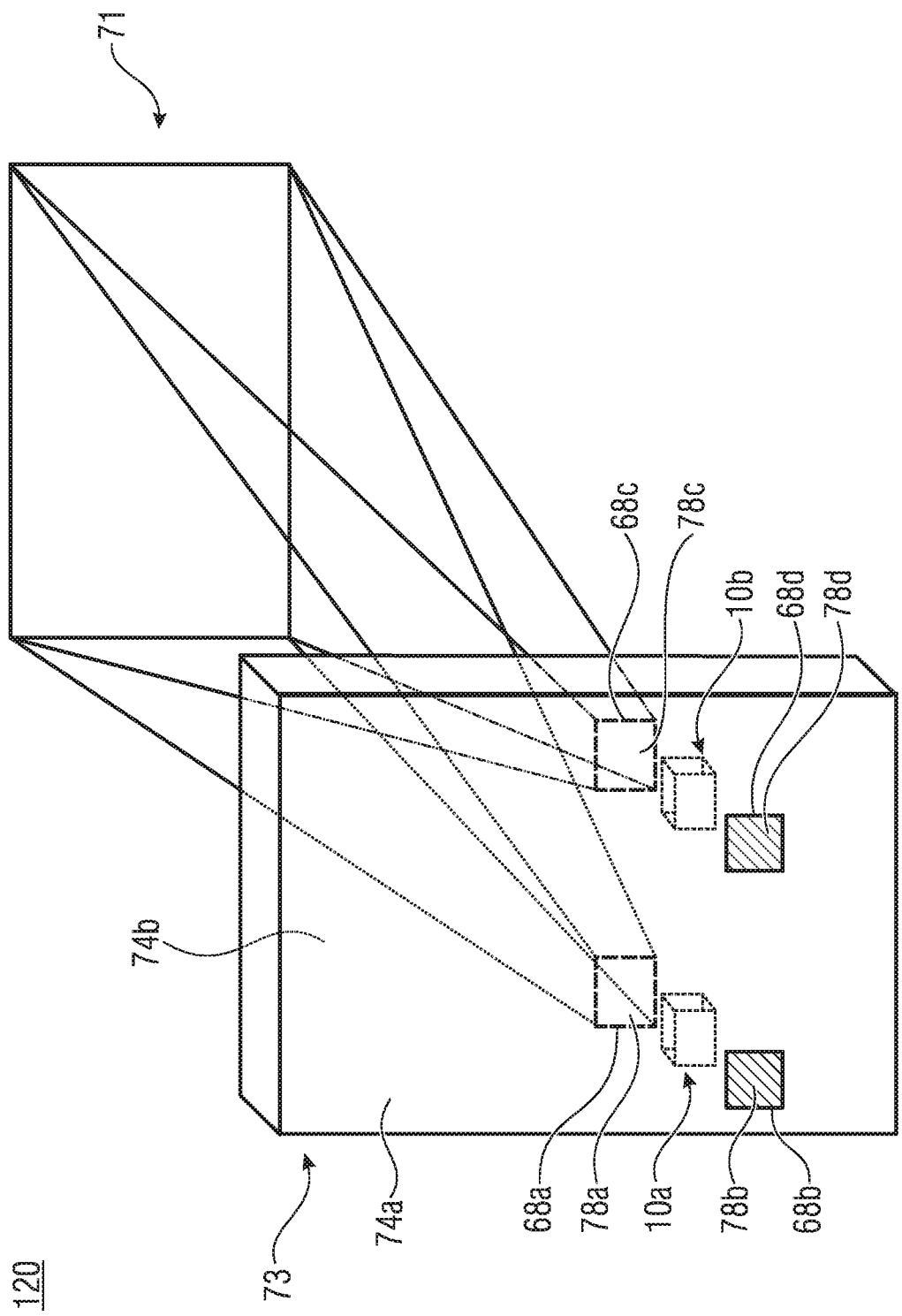
FIG. 12 shows a schematic perspective view of an imaging system comprising a housing and at least one first and one second multi-aperture imaging device.

FIG. 12 shows a schematic perspective view of an imaging system 120 comprising a housing 73 and a first multi-aperture imaging device 10a and a second multi-aperture imaging device 10b arranged in the housing 73. The imaging system 120 is configured to capture the total field of view 71 at least partially, e.g., in the overlapping region of the capturing regions of the multi-aperture imaging devices 10a and 10b, in a stereoscopic manner with the multi-aperture imaging devices 10a and 10b. The overlapping region may form a part of the total field of view 71, but may cover the total field of view 71 almost entirely or entirely, i.e., with a ratio of at least 95%, at least 97%, or at least 99%. For example, the total field of view 71 is arranged at a main side 74b of the housing 73 facing away from a main side 74a. For example, the multi-aperture imaging devices 10a and 10b may capture the total field of view 71 through transparent regions 68a and 68, respectively, wherein diaphragms 788 and 78c arranged in the main side 74b may at least be partially transparent. Diaphragms 78b and 78d arranged in the main side 74a may include transparent regions 78b and 78d, respectively, that at least partially optically close the transparent regions 68b and 68d so that an amount of stray light, which could falsify recordings of the multi-aperture imaging devices 10a and/or 10b, from a side facing the main side 74a is at least reduced. The main side 74a may be comparable to the housing side 23a of the apparatus 30. In the same way, the main side 74b may be comparable to the housing side 23b. As an alternative to providing a diaphragm 68a-d, the beam-deflecting means of one or both multi-aperture imaging devices 10a and/or 10b or a mutual beam-deflecting means may be moved out of the housing 73.

Although the multi-aperture imaging devices 10a and 10b are illustrated to be arranged spaced apart from each other, the multi-aperture imaging devices 10a and 10b may also be arranged to be spatially neighboring or in a combined manner. For example, the arrays of the imaging devices 10a and 10b may be arranged next to each other or in parallel to each other. The arrays may be formed in a multi-line manner or in a single-line manner and may form lines that are arranged towards each other, wherein each multi-aperture imaging device 10a and 10b comprises a single-line array, for example. The multi-aperture imaging devices 10a and 10b may comprise a mutual beam-deflecting means and/or a mutual carrier 47 and/or a mutual image sensor 12. This means that the multi-aperture imaging devices 10a and 10b and/or further multi-aperture imaging devices may comprise a mutual image sensor, a mutual electronic carrier for controlling and/or reading-out the multi-aperture imaging devices and/or a mutual beam-deflecting unit. Alternatively or additionally to the multi-aperture imaging device 10a and/or 10b, at least the multi-aperture imaging device 10',40, 50, 60, 70, 80, 90 and/or 100, and/or a further multi-aperture imaging device 10 may be arranged. The above-described mutual elements, e.g., the beam-deflecting means 18 or the array 14, may be used by a mutual optical image stabilizer, since a movement of the beam-deflecting means may mutually act for optical channels of several modules, which enables a mutual optical image stabilization, for example. Accordingly, the optical image stabilizer may also be mutually implemented for several modules and/or a mutual reference channel may be used for several modules.

The transparent regions 68a-d may be additionally equipped with a switchable diaphragm 78a-d that covers the optical structure in case they are not used. The diaphragms 78a-d may include a mechanically moved part. The movement of the mechanically moved part may be carried out using an actuator, e.g., as may be provided for other movements. The diaphragms 78a-d may alternatively or additionally be electrically controllable and include an electrochromic layer or an electrochromic layer sequence, i.e., be formed as an electrochromic diaphragm.

Figure 13:
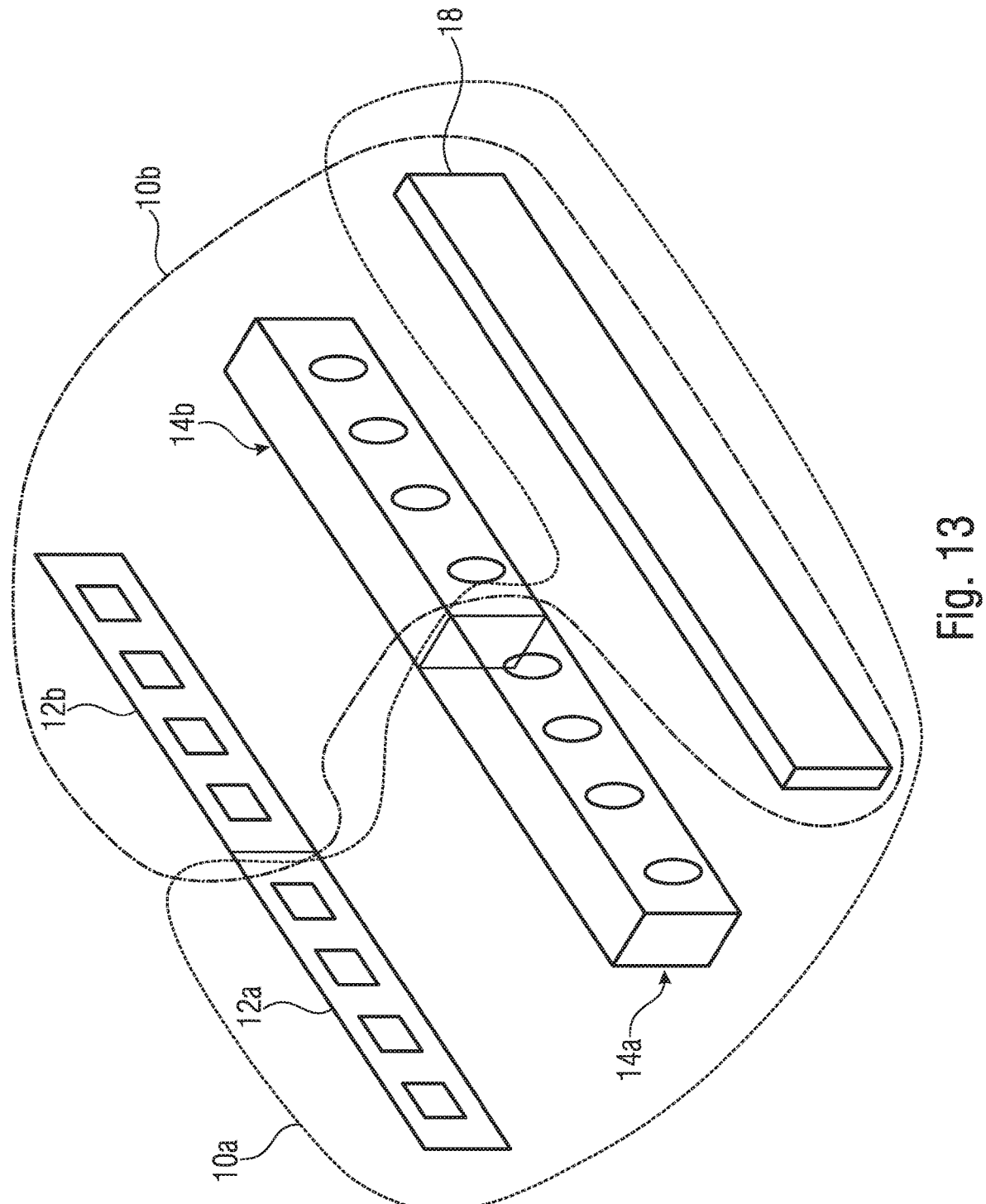
FIG. 13 shows a schematic design including a first multi-aperture imaging device and a second multi-aperture imaging device, for example, as may be arranged in the imaging system of FIG. 12, according to an embodiment.

FIG. 13 shows a schematic structure including a first multi-aperture imaging device 10a and a second multi-aperture imaging device 10b, as may be arranged in the imaging system 120, for example. The arrays 14a and 14b may be formed in a single-line manner and may form a mutual line. The image sensors 12a and 12b may be marked on a mutual substrate, or on a mutual circuit carrier, such as a mutual circuit board or a mutual flex board. Alternatively, the image sensors 12a and 12b may also include different substrates. Different mixes of these alternatives are obviously also possible, e.g., multi-aperture imaging devices including a mutual image sensor, a mutual array and/or a mutual beam-deflecting means 18 as well as further multi-aperture imaging devices comprising separate components. An advantage of a mutual image sensor, a mutual array and/or a mutual beam-deflecting means is that a movement of the respective components may be obtained with a higher precision by controlling a lower number of actuators, and a synchronization between actuators may be used or avoided. Furthermore, a high thermal stability may be obtained. Alternatively or additionally, other and/or different multi-aperture imaging devices may comprise a mutual array, a mutual image sensor and/or a mutual beam-deflecting means.

Figure 14:
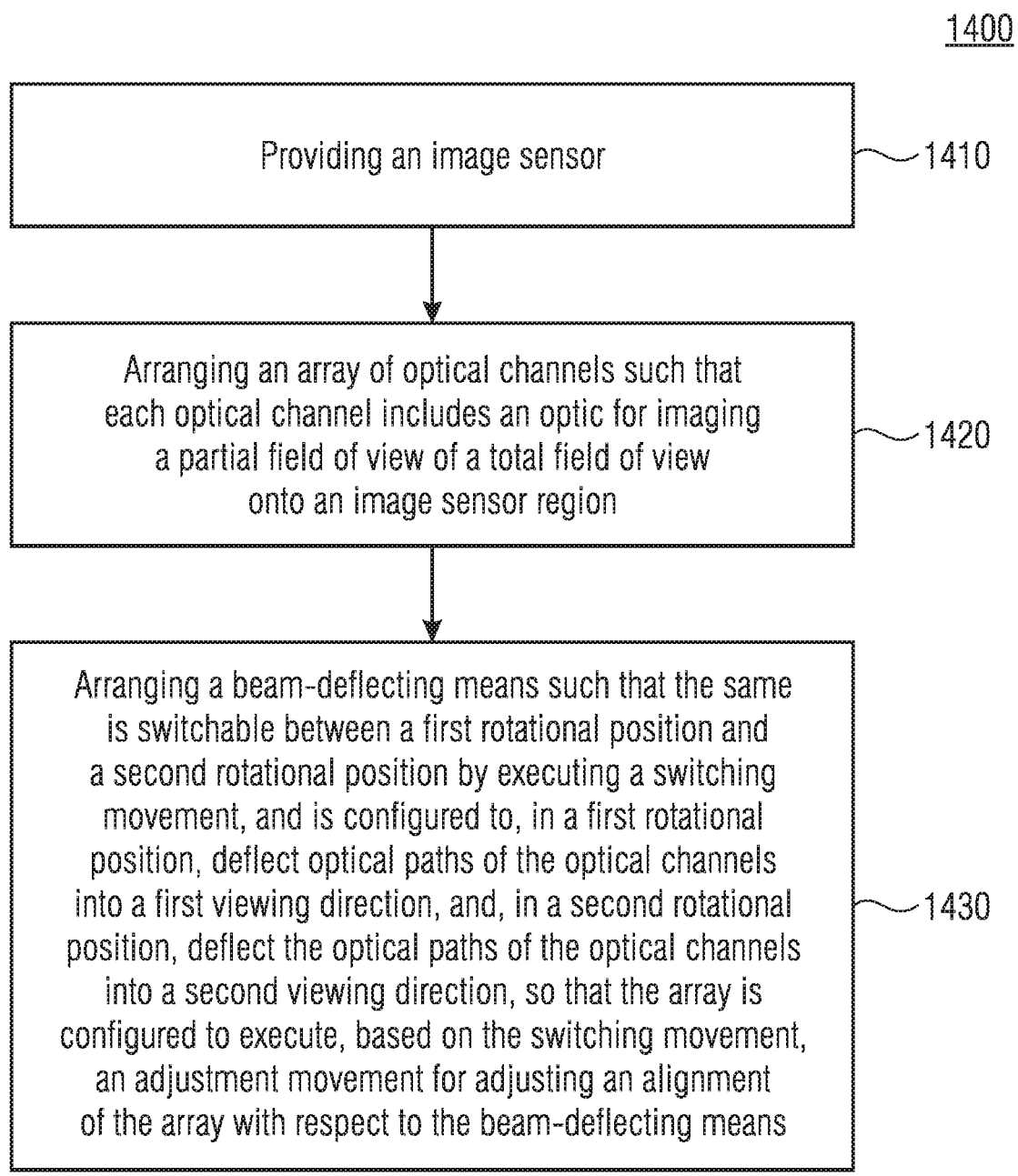
FIG. 14 shows a schematic flow diagram of a method for providing a multi-aperture imaging device according to an embodiment.

FIG. 14 shows a schematic flow diagram of a method 1400 providing a multi-aperture imaging device, e.g., the multi-aperture imaging device 10.

The method 1400 includes step 1410 of providing an image sensor. A step 1420 includes arranging an array of optical channels such that each optical channel includes an optic for imaging a partial field of view of a total field of view onto an image sensor region of the image sensor. Step 1430 includes arranging a beam-deflecting means such that the same is switchable between a first rotational position and a second rotational position by executing a switching movement and is configured to deflect, in a first rotational position, optical paths of the optical channels into a first viewing direction, and to deflect, in a second rotational position, the optical paths of the optical channels into a second viewing direction. The method is executed such that the array is configured to execute, based on the switching movement, an adjustment movement for adjusting an orientation of the array with respect to the beam-deflecting means.

FIG. 15 shows a schematic flow diagram of a method 1500 for capturing an image region.

The method 1500 includes step 1510 of imaging a first object region with an array of optical channels, wherein each optical channels includes an optic for imaging a partial field of view of a total field of view onto an image sensor region of the image sensor; by deflecting optical paths of the optical channels into a first viewing direction with a first beam-deflecting means in a first rotational position. Step 1520 includes executing a switching movement of the beam-deflecting means in order to switch the same between the first rotational position and a second rotational position such that the optical channels are deflected into a second viewing direction. Step 1530 includes executing an adjustment movement of the array based on the switching movement in order to adjust an orientation of the array with respect to the beam-deflecting means.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Multi-aperture imaging device, comprising:
an image sensor;
an array of optical channels, each optical channel comprising an optic for imaging a partial field of view of a total field of view onto an image sensor region of the image sensor; and
a beam-deflector switchable between a first rotational position and a second rotational position by executing a switching movement and configured to deflect, in a first rotational position, optical paths of the optical channels into a first viewing direction and to deflect, in a second rotational position, the optical paths of the optical channels into a second viewing direction;
wherein the array is configured to execute, based on the switching movement, an adjustment movement for adjusting an orientation of the array with respect to the beam-deflector.

2. Multi-aperture imaging device according to claim 1, wherein the partial fields of view overlap with each other to enable joining individual partial fields of view to a total field of view.

3. Multi-aperture imaging device according to claim 1, wherein the viewing directions are arranged to be reversed towards each other within a tolerance range.

4. Multi-aperture imaging device according to claim 1, wherein the beam-deflector is configured to guide, in the first position, the optical paths with a first main side of the beam-deflector into the first viewing direction and to guide, in the second position, the optical paths with a second main side into the second viewing direction.

5. Multi-aperture imaging device according to claim 1, wherein the beam-deflector is configured to deflect all optical channels of the array.

6. Multi-aperture imaging device according to claim 1, wherein the adjustment movement differentiates itself from a movement for focusing and for optical image stabilization and the adjustment movement occurs in the absence of a translational distance change between the array and the image sensor along a direction parallel to an extension of the optical channels between the image sensor and the array.

7. Multi-aperture imaging device according to claim 1, wherein the adjustment movement takes place while maintaining a translational distance between the array and the image sensor along a direction arranged in parallel to an extension of the optical channels between the image sensor and the array.

8. Multi-aperture imaging device according to claim 1, configured to move the array during the adjustment movement in order to adjust a relative position between the array and the beam-deflector.

9. Multi-aperture imaging device according to claim 1, wherein, based on the adjustment movement, at least part of a movement range of the beam-deflector needed by the switching movement is reduced in comparison to an immovable array.

10. Multi-aperture imaging device according to claim 1, wherein, in the first rotational position and in the second rotational position, a lateral position of the beam-deflector along a thickness direction of the multi-aperture imaging device, which position is arranged perpendicularly to an axial direction between the image sensor and the array and perpendicularly to a line-extension direction of a line of the array along which optical channels are essentially arranged along a straight line, is equal to an extent of at least 20%.

11. Multi-aperture imaging device according to claim 1, wherein the switching movement comprises a rotational movement of the beam-deflector, wherein the adjustment movement comprises a translational movement of the array along a movement direction perpendicular to a line-extension direction of a line of the array along which optical channels are essentially arranged along a straight line and in parallel to a thickness direction of the multi-aperture imaging device.

12. Multi-aperture imaging device according to claim 1, wherein the switching movement comprises a rotational movement of the beam-deflector and a first translational movement of the beam-deflector along a first movement direction, wherein the adjustment movement comprises a second translational movement of the array along the movement direction.

13. Multi-aperture imaging device according to claim 12, wherein the first movement direction is arranged along the first viewing direction.

14. Multi-aperture imaging device according to claim 12, wherein the first translational movement and the second translational movement are equal within a tolerance range of 20% with respect to their magnitude.

15. Multi-aperture imaging device according to claim 1, wherein the switching movement from the first into the second rotational position comprises a first rotational movement of the beam-deflector, and the adjustment movement comprises a second rotational movement.

16. Multi-aperture imaging device according to claim 15, wherein the first and the second rotational movement occur in the same direction.

17. Multi-aperture imaging device according to claim 15, wherein a sum of a size of an angle of the first rotational movement and a size of an angle of the second rotational movement results in 90° within a tolerance range of 20%.

18. Multi-aperture imaging device according to claim 15, wherein the switching movement is exclusively executed by the rotational movement, wherein a rotation axis of the rotational movement along a thickness direction of a multi-aperture imaging device is centered within a tolerance range of 20% to a largest expansion of the beam-deflector along the thickness direction.

19. Multi-aperture imaging device according to claim 1, wherein the switching movement from the first into the second rotational position comprises a first rotational movement of the beam-deflector and a translational movement of the beam-deflector along a first movement direction;
wherein the adjustment movement comprises a translational movement of the array along the first movement direction, and comprises a second rotational movement.

20. Multi-aperture imaging device according to claim 1, wherein the adjustment movement comprises a translational movement along a thickness direction perpendicular to a line-extension direction of a line of the array along which optical channels are essentially arranged along a straight line of the multi-aperture imaging device.

21. Multi-aperture imaging device according to claim 1, wherein the array is configured to execute the adjustment movement such that diverging beams of the optical path of the optical channels strike the beam-deflector to an extent of at least 90%.

22. Multi-aperture imaging device according to claim 1, wherein the first viewing direction and the second viewing direction are arranged in the opposite direction within a tolerance range of ±30°.

23. Multi-aperture imaging device according to claim 1, wherein a needed dimension D of the multi-aperture imaging device along a direction perpendicular to a line-extension direction of a line of the array along which optical channels are essentially arranged along a straight line and perpendicular to a course of the optical paths between the image sensor and the array fulfils, due to the adjustment movement, the following condition:

$$D < A + 2B$$

wherein A describes a value of the maximum dimension of the array and the image sensor along a thickness direction in parallel to the first or second viewing directions, and B describes an overhang of the beam-deflector with respect to the array in the first and second rotational positions along the thickness direction.

24. Multi-aperture imaging device according to claim 1, wherein the array and the image sensor are mechanically coupled to each other and are configured to mutually execute the adjustment movement.

25. Multi-aperture imaging device according to claim 1, wherein the array, the image sensor, and actuators for providing a focusing and/or actuators for an optical image stabilization are mechanically coupled to each other and are configured to mutually execute the adjustment movement.

26. Multi-aperture imaging device according to claim 1, wherein the beam-deflector comprises a first reflecting main side and a second reflecting main side, the first and second reflecting main sides being inclined towards each other with an angle of at most 60°.

27. Multi-aperture imaging device according to claim 1, comprising a diaphragm structure arranged to at least partially close a slit between the array and the beam-deflector.

28. Multi-aperture imaging device according to claim 27, wherein each partial field of view is assigned a direction into which an optical path of an optical channel is deflected with the beam-deflector, wherein the diaphragm structure is configured to at least partially reduce an entry of light from a direction along the viewing direction that differs from the directions assigned to the partial fields of view.

29. Multi-aperture imaging device according to claim 27, wherein the diaphragm structure is mechanically connected to the beam-deflector and is movable together with the beam-deflector.

30. Multi-aperture imaging device according to claim 27, wherein, in the first position and in the second position, the diaphragm structure is on the one hand in mechanical contact with the array or a transparent structure configured to at least partially reduce an entry of particles towards the beam-deflector, and on the other hand with the beam-deflector.

31. Multi-aperture imaging device according to claim 27, wherein, in the first position, the diaphragm structure, adjacent to a first auxiliary side of the array, is in mechanical contact with the same and, in the second position, is in mechanical contact adjacent to an opposing second auxiliary side of the array, wherein the beam-deflector comprises a third rotational position rotationally arranged between the first rotational position and the second rotational position, and in which the diaphragm structure is spaced apart from the first and the second auxiliary sides of the array.

32. Multi-aperture imaging device according to claim 31, configured to provide a translational movement between the array and the beam-deflector during the switching movement in order to temporarily increase a distance between the array and the beam-deflector such that the diaphragm structure is temporarily without contact to the array or the beam-deflector.

33. Multi-aperture imaging device according to claim 27, wherein the diaphragm structure is configured to be, on the one hand, in mechanical contact with the array or a transparent structure configured to at least partially reduce an entry of particles towards the beam-deflector, and, on the other hand, with the beam-deflector, if the optical paths are deflected, wherein the diaphragm structure comprises a mechanical rigidity that generates, upon a relative movement between the array and the beam-deflector for the optical image stabilization, a restoring force configured to restore at least 30% of a maximum relative movement.

34. Multi-aperture imaging device according to claim 27, wherein the diaphragm structure comprises a magnetic material, and wherein a magnetic field-providing element is arranged adjacent to the diaphragm structure and is configured to attract the diaphragm structure.

35. Multi-aperture imaging device according to claim 27, wherein a transparent structure is arranged along a direction along which the optical paths are deflected, and is configured to at least partially reduce an entry of particles towards the beam-deflector, wherein a surface roughness of the diaphragm structure is larger than a surface roughness of the transparent structure.

36. Multi-aperture imaging device according to claim 27, wherein the beam-deflector is formed as an array of facets arranged side by side, wherein each optical channel is assigned to one of the facets, wherein the diaphragm structure extends across the array of facets.

37. Multi-aperture imaging device according to claim 27, wherein the diaphragm structure is formed to be elastic.

38. Multi-aperture imaging device according to claim 27, wherein the diaphragm structure is formed to be partially or entirely opaque.

39. Multi-aperture imaging device according to claim 1, wherein the array comprises a transparent carrier through which the optical channels extend and at which the optics are fixed.

40. Multi-aperture imaging device according to claim 1, comprising a focuser for setting a focus of the multi-aperture imaging device by changing a distance between the array and the beam-deflector.

41. Multi-aperture imaging device according to claim 40, wherein the focuser is configured to set the focus with respect to one, a multitude of or all of the optical channels together.

42. Multi-aperture imaging device according to claim 1, comprising an optical image stabilizer for image stabilization along a first image axis by generating a translational relative movement between the image sensor and the array and the beam-deflector, and for image stabilization along a second image axis by generating a rotational movement of the beam-deflector.

43. Multi-aperture imaging device according to claim 1, arranged in a housing, and wherein the beam-deflector is mechanically connected to a travel carriage that is movable along a translational movement direction in order to move the beam-deflector between a first position within the housing and the second position outside the housing.

44. Multi-aperture imaging device according to claim 43, wherein the travel carriage comprises a first transparent region and a second transparent region, the beam-deflector being arranged therebetween, so that, in the first rotational position, the optical paths are guided through the first transparent region, and, in the second rotational position, are guided through the second transparent region, wherein a distance between the first and second region of the travel carriage is variable, and wherein the distance is smaller in the first position of the beam-deflector than in the second position of the beam-deflector.

45. Imaging system, comprising first and second modules comprising a multi-aperture imaging device according to claim 1, wherein the first and the second modules are configured to at least stereoscopically capture the total field of view.

46. Imaging system according to claim 45, wherein the first module and the second module at least comprise one of a mutual array, a mutual beam-deflector, and a mutual image sensor.

47. Method for capturing an object region, comprising:
  imaging a first object region with an array of optical channels, each optical channel comprising an optic for imaging a partial field of view of a total field of view onto an image sensor region of the image sensor; by deflecting optical paths of the optical channels in a first viewing direction with a beam-deflector in a first rotational position;
  executing a switching movement of the beam-deflector in order to switch the same between the first rotational position and a second rotational position so that the optical channels are deflected into a second viewing direction;
  executing an adjustment movement of the array based on the switching movement in order to adjust an orientation of the array with respect to the beam-deflector.

48. Method for providing a multi-aperture imaging device, comprising:
  providing an image sensor;
  arranging an array of optical channels such that each optical channel comprises an optic for imaging a partial field of view of a total field of view onto an image sensor region of the image sensor;
  arranging a beam-deflector such that the same is switchable between a first rotational position and a second rotational position by executing a switching movement, and is configured to deflect, in a first rotational position, optical paths of the optical channels into a first viewing direction, and to deflect, in a second rotational position, the optical paths of the optical channels into a second viewing direction;
  so that the array is configured to execute, based on the switching movement, an adjustment movement for adjusting an orientation of the array with respect to the beam-deflector.

* * * * *